(12) United States Patent
Pan et al.

(10) Patent No.: US 10,080,236 B2
(45) Date of Patent: Sep. 18, 2018

(54) TIME-DIVISION DUPLEXING COMMUNICATION METHOD, SYSTEM AND DEVICE

(71) Applicant: CHINA ACADEMY OF TELECOMMUNICATIONS TECHNOLOGY, Beijing (CN)

(72) Inventors: Xueming Pan, Beijing (CN); Zukang Shen, Beijing (CN); Jing Xu, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 0 days.

(21) Appl. No.: 14/387,542

(22) PCT Filed: Mar. 6, 2013

(86) PCT No.: PCT/CN2013/072243
§ 371 (c)(1),
(2) Date: Sep. 23, 2014

(87) PCT Pub. No.: WO2013/139208
PCT Pub. Date: Sep. 26, 2013

(65) Prior Publication Data
US 2015/0049654 A1   Feb. 19, 2015

(30) Foreign Application Priority Data

Mar. 23, 2012 (CN) .......................... 2012 1 0080085

(51) Int. Cl.
*H04W 72/14* (2009.01)
*H04B 7/26* (2006.01)
*H04L 5/14* (2006.01)

(52) U.S. Cl.
CPC .......... *H04W 72/14* (2013.01); *H04B 7/2643* (2013.01); *H04L 5/14* (2013.01)

(58) Field of Classification Search
CPC ......... H04W 72/14; H04B 7/2643; H04L 5/14
See application file for complete search history.

(56) References Cited

U.S. PATENT DOCUMENTS

2010/0080166 A1\* 4/2010 Palanki ............... H04B 7/2606
370/315
2011/0085478 A1  4/2011 Zhongfeng et al.
(Continued)

FOREIGN PATENT DOCUMENTS

CN  102064879 A  5/2011
CN  102201859 A  9/2011
(Continued)

OTHER PUBLICATIONS

PCT International Search Report for PCT Counterpart Application No. PCT/CN2013/072243, 5 pages (including English translation), (dated Jun. 13, 2013).
(Continued)

*Primary Examiner* — Albert T Chou
(74) *Attorney, Agent, or Firm* — Womble Bond Dickinson (US) LLP

(57) ABSTRACT

The embodiments of the present invention relate to the technical field of wireless communications, and particularly, to a time-division duplexing communication method, system and device, which are used for solving the problem in the prior art that there is no uplink or downlink HARQ sequential relationship for a dynamic uplink and downlink subframe distribution solution. A time-division duplexing uplink data sending method in the embodiments of the present invention comprises: through a subframe n in a wireless frame, user equipment receiving indication information which comes from the network side; and according to the indication information, when it is determined that
(Continued)

PUSCH data is required to be sent to the network side, sending the PUSCH data through at least one uplink subframe after the subframe n, the subframe n being a downlink fixed subframe or a special subframe. Proposed is an uplink and downlink HARQ sequential relationship for a dynamic uplink and downlink subframe distribution solution, so that a dynamic TDD system can transmit uplink and downlink data.

7 Claims, 8 Drawing Sheets

(56) References Cited

U.S. PATENT DOCUMENTS

| | | | |
|---|---|---|---|
| 2011/0096701 A1 | 4/2011 | Lin | |
| 2011/0110280 A1* | 5/2011 | Li | H04B 7/155 370/280 |
| 2011/0176461 A1 | 7/2011 | Astely et al. | |
| 2012/0044841 A1 | 2/2012 | Chen et al. | |

FOREIGN PATENT DOCUMENTS

| | | |
|---|---|---|
| CN | 102223214 A | 10/2011 |
| CN | 102231662 A | 11/2011 |
| JP | 2011-521500 A | 7/2011 |
| KR | 10-2010-0105731 A | 9/2010 |
| WO | WO 2010/049587 A1 | 5/2010 |
| WO | WO 2010/131886 A2 | 11/2010 |
| WO | WO 2011/077288 A2 | 6/2011 |
| WO | WO 2012/165782 A2 | 12/2012 |

OTHER PUBLICATIONS

PCT Written Opinion of the International Searching Authority for PCT Counterpart Application No. PCT/CN2013/072243, 26 pages (including English translation), (dated Jun. 13, 2013).

Office Action for corresponding Japanese Patent Application No. 2015-500752, 8 pp., (dated Sep. 15, 2015).

Ericsson, et al., "Specification Impact of TDD Traffic Adaptation", 3GPP TSG-RAN WG1 #68bis, R1-121709, Jeju, Korea, 3 pp., (Mar. 26-30, 2012).

Renesas Mobile Europe, "Remaining Issues on PDSCH HARQ for CC Specific TDD Configuration", 3GPP TSG-RAN WG1 Meeting #68bis, R1-121379, Jeju, Korea, 4 pp., (Mar. 26-30, 2012).

3GPP, "3$^{rd}$ Generation Partnership Project; Technical Specification Group Radio Access Network; Evolved Universal Terrestrial Radio Access (E-UTRA); Physical Channels and Modulation (Release 10)", 3GPP TS 36.211, V10.1.0, 15 pp., (Mar. 2011).

3GPP, "3$^{rd}$ Generation Partnership Project; Technical Specification Group Radio Access Network; Evolved Universal Terrestrial Radio Access (E-UTRA); Physical Layer Procedures (Release 10)", 3GPP TS 36.213, V10.1.0, 57 pp., (Mar. 2011).

European Patent Office Communication enclosing Extended European Search Report for corresponding European Patent Application No. 13764633.7, 8 pp., (dated Feb. 18, 2015).

PCT Notification Concerning Transmittal of International Preliminary Report on Patentability (Chapter 1 of the Patent Cooperation Treaty) for PCT Counterpart Application No. PCT/CN2013/072243, 29 pp., (dated Oct. 2, 2014).

Office Action for corresponding Korean Parent Application No. 10-2014-7029729, 10 pp., (dated Jun. 2, 2015).

Second Office Action for corresponding Japanese Patent Application No. 2015-500752, 8 pp., (dated Apr. 26, 2016).

Office Action for corresponding Chinese Patent Application No. 201210080085.X, 13 pp., (dated Oct. 23, 2015).

European Patent Office Communication enclosing Office Action for corresponding European Patent Application No. 13764633.7, 11 pp., (dated Nov. 18, 2016).

Office Action for Chinese Patent Application No. 2016-146776 with English translation, 11 pgs., (dated Sep. 5, 2017).

Office Action for Chinese Patent Application No. 2016146777 with English translation, 6 pgs., (dated Sep. 6, 2017).

* cited by examiner

TIME-DIVISION DUPLEXING COMMUNICATION METHOD, SYSTEM AND DEVICE

CROSS-REFERENCE TO RELATED APPLICATIONS

The present application is a U.S. National Stage Application under 35 U.S.C. §371 of International Application No. PCT/CN2013/072243, filed on Mar. 6, 2013, entitled TIME-DIVISION DUPLEXING COMMUNICATION METHOD, SYSTEM AND DEVICE, designating the United States, and claiming the benefit of Chinese Patent Application No. 201210080085.X, filed with the Chinese Patent Office on Mar. 23, 2012, and entitled "Time division duplex communication method, system and apparatus", which was incorporated by reference in its entirety.

FIELD

The present invention relates to the field of wireless communications and particularly to a time division duplex communication method, system and apparatus.

BACKGROUND

The Time Division Duplex (TDD) mode which is one of two general duplex systems refers to the use of the same operating band in the uplink and the downlink, transmission of uplink and downlink signals over different time intervals and the presence of a Guard Period (GP) between the uplink and the downlink.

There is a frame structure of a Long Term Evolution (LTE) TDD system as illustrated in FIG. 1, where a radio frame has a length of 10 ms and includes two types of sub-frames which are special sub-frames and normal sub-frames, totaling to 10 sub-frames, each of which is 1 ms. The special sub-frames include three sub-frames which are a Downlink Pilot Slot (DwPTS) for transmission of a Primary Synchronization Signal (PSS), a Physical Downlink Control Channel (PDCCH), a Physical Hybrid Automatic Repeat Request (HARQ) Indication Channel (PHICH), a Physical Control Format Indication Channel (PCFICH), a Physical Downlink Shared Channel (PDSCH), etc.; a GP for a guard period between the downlink and the uplink; and an Uplink Pilot Slot (UpPTS) for transmission of a Sounding Reference Signal (SRS), a Physical Random Access Channel (PRACH), etc. The normal sub-frames include uplink sub-frames and downlink sub-frames for transmission of an uplink/downlink control channel, service data, etc. The sub-frame 0 and the sub-frame 5 as well as the DwPTS sub-frame among the special sub-frames are constantly used for downlink transmission, the sub-frame 2 and the UpPTS sub-frame among the special sub-frames are constantly used for uplink transmission, and the other sub-frames can be configured for uplink transmission or downlink transmission as needed.

Uplink/downlink signals are transmitted in different sub-frames over the same frequency resources in the uplink and the downlink in a TDD system. In common TDD systems including a 3G Time Division-Synchronous Code Division Multiple Access (TD-SCDMA) system and a 4G TD-LTE system, uplink and downlink sub-frames are allocated statically or semi-statically, and a common practice is to plan a network by determining the proportion of uplink to downlink sub-frames according to the type of a cell and a rough proportion of traffic and keeping the proportion unchanged. This is a simple practice in the context of large coverage by a macro cell. However an increasing number of low-power base stations including a pico cell, a home NodeB, etc., have been deployed for small local coverage along with the advancement of technologies, and there are a small number of users and a significantly varying demand of the users for traffic in these cells, thus resulting in a dynamically varying proportion of uplink to downlink traffic as needed in the cells.

In order to address this problem, there has been proposed a scheme for dynamic allocation of uplink and downlink sub-frames, where four types of sub-frames are set in a specific period of time (for example, which is a radio frame) respectively as sub-frames constantly used for downlink transmission, sub-frames constantly used for uplink transmission, special sub-frames and flexible sub-frames allocated flexibly for uplink or downlink transmission, and the uplink and downlink configuration of the sub-frames can be varied dynamically due to the flexible sub-frames in the radio frame to thereby accommodate a demand for traffic in the cell. However there has been absent so far an uplink and downlink Hybrid Automatic Repeat reQuest (HARQ) timing relationship for the scheme for dynamic allocation of uplink and downlink sub-frames.

In summary there has been absent so far an uplink and downlink HARQ timing relationship for the scheme for dynamic allocation of uplink and downlink sub-frames.

SUMMARY

Embodiments of the invention provide a time division duplex communication method, system and apparatus so as to address the problem in the prior art of the absence so far of an uplink and downlink HARQ timing relationship for a scheme for dynamic allocation of uplink and downlink sub-frames.

An embodiment of the invention provides a method of time division duplex transmission of uplink data, the method including:

a user equipment receiving indication information from the network side in the sub-frame n in a radio frame, wherein the sub-frame 0 and the sub-frame 5 in the radio frame are fixed downlink sub-frames, the sub-frame 2 is a fixed uplink sub-frame, the sub-frame 1 is a special sub-frame, the sub-frame 6 is a special sub-frame or a downlink sub-frame, the remaining sub-frames are flexible sub-frames which can be used for uplink or downlink transmission, and the sub-frame n is a fixed downlink sub-frame or a special sub-frame; and the user equipment transmitting PUSCH data in at least one uplink sub-frame after the sub-frame n upon determining from the indication information that the PUSCH data needs to be transmitted to the network side.

An embodiment of the invention provides a method of time division duplex reception of downlink data, the method including:

a user equipment receiving PDSCH data from the network side in the sub-frame m in a radio frame, wherein the sub-frame 0 and the sub-frame 5 in the radio frame are fixed downlink sub-frames, the sub-frame 2 is a fixed uplink sub-frame, the sub-frame 1 is a special sub-frame, the sub-frame 6 is a special sub-frame or a downlink sub-frame, the remaining sub-frames are flexible sub-frames which can be used for uplink or downlink transmission, and the sub-frame n is a downlink sub-frame to carry the PDSCH data; and the user equipment determining a sub-frame to carry feedback information corresponding to the PDSCH data according to a timing relationship between the feedback information and transmission of the PDSCH data and transmitting the feedback information in the determined sub-frame.

An embodiment of the invention provides a method of time division duplex transmission of downlink data, the method including:

the network side determining the sub-frame n to carry indication information in a radio frame, wherein the sub-frame 0 and the sub-frame 5 in the radio frame are fixed downlink sub-frames, the sub-frame 2 is a fixed uplink sub-frame, the sub-frame 1 is a special sub-frame, the sub-frame 6 is a special sub-frame or a downlink sub-frame, the remaining sub-frames are flexible sub-frames which can be used for uplink or downlink transmission, and the sub-frame n is a fixed downlink sub-frame or a special sub-frame; and the network side transmitting the indication information to a user equipment in the sub-frame n.

An embodiment of the invention provides a method of time division duplex reception of uplink data, the method including:

the network side determining a sub-frame to carry feedback information corresponding to PDSCH data in a radio frame according to a timing relationship between the feedback information and transmission of the PDSCH data, wherein the sub-frame 0 and the sub-frame 5 in the radio frame are fixed downlink sub-frames, the sub-frame 2 is a fixed uplink sub-frame, the sub-frame 1 is a special sub-frame, the sub-frame 6 is a special sub-frame or a downlink sub-frame, and the remaining sub-frames are flexible sub-frames which can be used for uplink or downlink transmission; and the network side receiving the feedback information from a user equipment in the determined sub-frame.

An embodiment of the invention provides a user equipment for time division duplex transmission of uplink data, the user equipment including:

a first reception module configured to receive indication information from the network side in the sub-frame n in a radio frame, wherein the sub-frame 0 and the sub-frame 5 in the radio frame are fixed downlink sub-frames, the sub-frame 2 is a fixed uplink sub-frame, the sub-frame 1 is a special sub-frame, the sub-frame 6 is a special sub-frame or a downlink sub-frame, the remaining sub-frames are flexible sub-frames which can be used for uplink or downlink transmission, and the sub-frame n is a fixed downlink sub-frame or a special sub-frame; and a first transmission module configured to transmit PUSCH data in at least one uplink sub-frame after the sub-frame n upon determining from the indication information that the PUSCH data needs to be transmitted to the network side.

An embodiment of the invention provides a user equipment for time division duplex reception of downlink data, the user equipment including:

a second reception module configured to receive PDSCH data from the network side in the sub-frame m in a radio frame, wherein the sub-frame 0 and the sub-frame 5 in the radio frame are fixed downlink sub-frames, the sub-frame 2 is a fixed uplink sub-frame, the sub-frame 1 is a special sub-frame, the sub-frame 6 is a special sub-frame or a downlink sub-frame, the remaining sub-frames are flexible sub-frames which can be used for uplink or downlink transmission, and the sub-frame n is a downlink sub-frame to carry the PDSCH data; and a second transmission module configured to determine a sub-frame to carry feedback information corresponding to the PDSCH data according to a timing relationship between the feedback information and transmission of the PDSCH data and to transmit the feedback information in the determined sub-frame.

An embodiment of the invention provides a network-side apparatus for time division duplex transmission of downlink data, the user equipment including:

a first determination module configured to determine the sub-frame n to carry indication information in a radio frame, wherein the sub-frame 0 and the sub-frame 5 in the radio frame are fixed downlink sub-frames, the sub-frame 2 is a fixed uplink sub-frame, the sub-frame 1 is a special sub-frame, the sub-frame 6 is a special sub-frame or a downlink sub-frame, the remaining sub-frames are flexible sub-frames which can be used for uplink or downlink transmission, and the sub-frame n is a fixed downlink sub-frame or a special sub-frame; and a third transmission module configured to transmit the indication information to a user equipment in the sub-frame n.

An embodiment of the invention provides a network-side apparatus for time division duplex reception of uplink data, the user equipment including:

a second determination module configured to determine a sub-frame to carry feedback information corresponding to PDSCH data in a radio frame according to a timing relationship between the feedback information and transmission of the PDSCH data, wherein the sub-frame 0 and the sub-frame 5 in the radio frame are fixed downlink sub-frames, the sub-frame 2 is a fixed uplink sub-frame, the sub-frame 1 is a special sub-frame, the sub-frame 6 is a special sub-frame or a downlink sub-frame, the remaining sub-frames are flexible sub-frames which can be used for uplink or downlink transmission, and the sub-frame m is a downlink sub-frame; and a third reception module configured to receive the feedback information from a user equipment in the determined sub-frame.

An embodiment of the invention provides a division duplex communication system including:

a user equipment configured to receive indication information from the network side in the sub-frame n in a radio frame and to transmit PUSCH data in at least one uplink sub-frame after the sub-frame n upon determining from the indication information that the PUSCH data needs to be transmitted to the network side; and a network-side apparatus configured to determine the sub-frame n to carry the indication information in the radio frame and to transmit the indication information to the user equipment in the sub-frame n;

wherein the sub-frame 0 and the sub-frame 5 in the radio frame are fixed downlink sub-frames, the sub-frame 2 is a fixed uplink sub-frame, the sub-frame 1 is a special sub-frame, the sub-frame 6 is a special sub-frame or a downlink sub-frame, the remaining sub-frames are flexible sub-frames which can be used for uplink or downlink transmission, and the sub-frame n is a fixed downlink sub-frame or a special sub-frame.

An embodiment of the invention provides a division duplex communication system including:

a user equipment configured to receive PDSCH data from the network side in the sub-frame m in a radio frame, to determine a sub-frame to carry feedback information corresponding to the PDSCH data according to a timing relationship between the feedback information and transmission of the PDSCH data and to transmit the feedback information in the determined sub-frame; and a network-side apparatus configured to determine the sub-frame to carry the feedback information corresponding to the PDSCH data in the radio frame according to the timing relationship between the feedback information and transmission of the PDSCH data and to receive the feedback information from the user equipment in the determined sub-frame;

wherein the sub-frame 0 and the sub-frame 5 in the radio frame are fixed downlink sub-frames, the sub-frame 2 is a fixed uplink sub-frame, the sub-frame 1 is a special sub-frame, the sub-frame 6 is a special sub-frame or a downlink sub-frame, the remaining sub-frames are flexible sub-frames which can be used for uplink or downlink transmission, and the sub-frame n is a downlink sub-frame.

In the uplink HARQ timing relationship according to the embodiments of the invention, the user equipment receives the indication information from the network side in the sub-frame n in the radio frame and transmits the PUSCH data in at least one uplink sub-frame after the sub-frame n upon determining from the indication information that the PUSCH data needs to be transmitted to the network side; and in the downlink HARQ timing relationship according to the embodiments of the invention, the user equipment receives the PDSCH data from the network side in the sub-frame m in the radio frame, determines the sub-frame to carry the feedback information corresponding to the PDSCH data according to the timing relationship between the feedback information and the PDSCH data, and transmits the feedback information in the determined sub-frame, thus addressing the problem in the prior art of the absence of an HARQ timing relationship for dynamic uplink and downlink configuration and enabling the dynamic TDD system to transmit uplink and downlink data.

DETAILED DESCRIPTION

Figure 1:
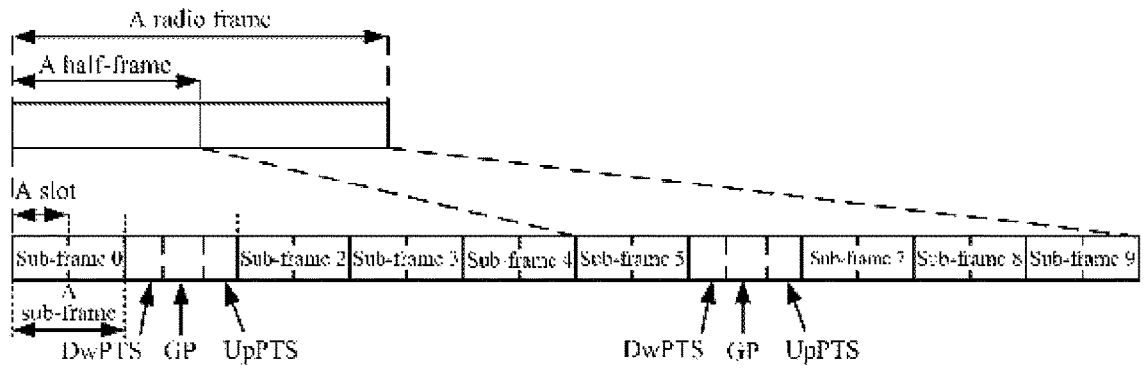
FIG. 1 is a schematic structural diagram of a frame in the TD-LTE system in the prior art.

A user equipment according to embodiments of the invention receives indication information from the network side in the sub-frame n in a radio frame and transmits PUSCH data in at least one uplink sub-frame after the sub-frame n upon determining from the indication information that the PUSCH data needs to be transmitted to the network side; and the network side according to the embodiments of the invention determines the sub-frame n to carry the indication information in the radio frame and transmits the indication information to the user equipment in the sub-frame n, thus addressing the problem in the prior art of the absence of an HARQ timing relationship for dynamic uplink and downlink configuration and enabling the dynamic TDD system to transmit uplink and downlink data.

The radio frame of the embodiments of the invention includes flexible sub-frames, fixed downlink sub-frames, fixed uplink sub-frames and special sub-frames, where the fixed downlink sub-frames are sub-frames with a fixed transmission direction which is the downlink direction and downlink pilot slots in special sub-frames; the fixed uplink sub-frames are sub-frames with a fixed transmission direction which is the uplink direction; and the flexible sub-frame are sub-frames with a variable transmission direction, and the flexible sub-frames can further include uplink flexible sub-frames and downlink flexible sub-frames, where the uplink flexible sub-frames are flexible sub-frames determined for uplink transmission, and the downlink flexible sub-frames are flexible sub-frames determined for downlink transmission.

Uplink pilot slots in the special sub-frames in the embodiments of the invention have the same functions as those of the uplink pilot slots in the special sub-frames in the prior art, so a repeated description thereof will be omitted here.

The embodiments of the invention can be applicable to a TDD system (e.g., a TD-LTE system) or can be applicable to other systems for which uplink and downlink sub-frame configuration needs to be adjusted dynamically, e.g., a TD-SCDMA system and subsequent evolved systems, a Worldwide Interoperability for Microwave Access (WiMAX) system and subsequent evolved systems, etc.

Figure 2A:
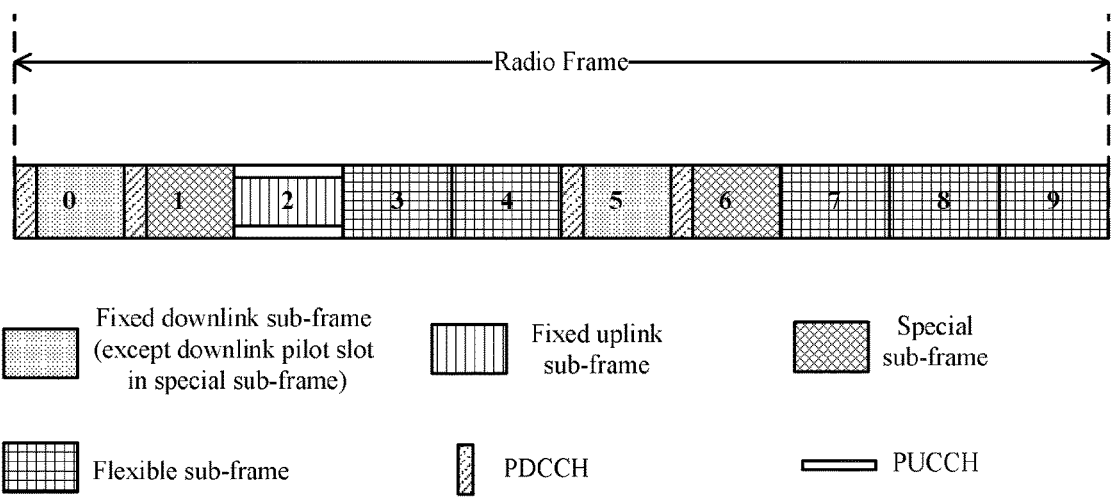
FIG. 2A is a schematic diagram of a first structure of sub-frames according to an embodiment of the invention.
Figure 2B:
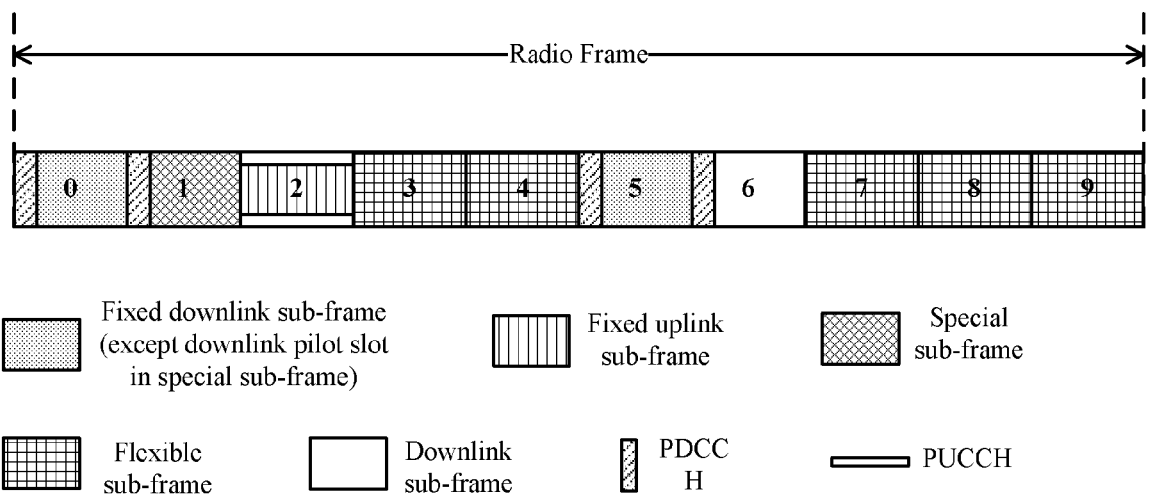
FIG. 2B is a schematic diagram of a second structure of sub-frames according to an embodiment of the invention.

In order to support the use of a larger number of downlink sub-frames, only one fixed uplink sub-frame may be set in a radio frame, that is, the sub-frame 2 is set as a fixed uplink sub-frame, the sub-frame 0 and the sub-frame 5 are set as fixed downlink sub-frames, the sub-frame 1 is set as a special sub-frame, the sub-frame 6 is set as a special sub-frame or a downlink sub-frame (a sub-frame with a downlink transmission direction), and the remaining sub-frames are set flexible sub-frames;

Where when a sub-frame 7 is an uplink sub-frame (that is, the sub-frame 7 is a flexible sub-frame with an uplink transmission direction, i.e., a variable uplink sub-frame), the sub-frame 6 is a special sub-frame, and the structure of the radio frame is as illustrated in FIG. 2A;

When the sub-frame 7 is a downlink sub-frame (that is, the sub-frame 7 is a flexible sub-frame with a downlink transmission direction, i.e., a variable downlink sub-frame), the sub-frame 6 is a downlink sub-frame (i.e., a sub-frame with a downlink transmission direction), and the structure of the radio frame is as illustrated in FIG. 2B; and in this frame structure, the highest proportion of downlink (DL) sub-frames to uplink (UL) sub-frames that can be supported is 9:1 to thereby make an adaptive dynamic range of resources in the dynamic TDD system larger and better adapt to variable traffic.

The embodiments of the invention propose an uplink and downlink HARQ timing relationship of a TDD system for the dynamic allocation schemes of uplink and downlink sub-frames illustrated in FIG. 2A and FIG. 2B.

In the following description, firstly an implementation with cooperation of the user equipment and the network side will be described, and finally implementations at the user equipment and the network side will be described respectively, but this will not suggest required cooperation of both the sides for an implementation, and in fact, problems present respectively at the user equipment and the network side will also be addressed in the separate implementations at the user equipment and the network side, although a better technical effect can be achieved in the implementation with cooperation of both the sides.

The embodiments of the invention will be further described below in details with reference to the drawings.

Figure 3:
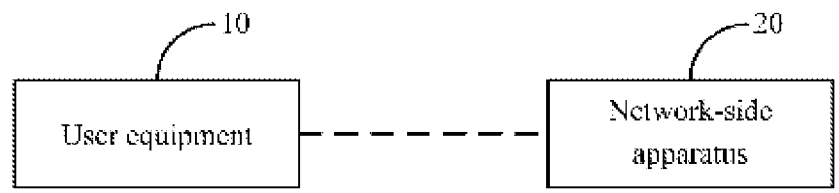
FIG. 3 is a schematic structural diagram of a first time division duplex communication system according to an embodiment of the invention.

As illustrated in FIG. 3, a first time division duplex communication system of an embodiment of the invention includes a user equipment 10 and a network-side apparatus 20.

The user equipment 10 is configured to receive indication information from the network side in the sub-frame n in a radio frame and to transmit PUSCH data in at least one uplink sub-frame after the sub-frame n upon determining from the indication information that the PUSCH data needs to be transmitted to the network side; and The network-side apparatus 20 is configured to determine the sub-frame n to carry the indication information in the radio frame and to transmit the indication information to the user equipment in the sub-frame n;

Where the sub-frame 0 and the sub-frame 5 in the radio frame are fixed downlink sub-frames, the sub-frame 2 is a fixed uplink sub-frame, the sub-frame 1 is a special sub-frame, the sub-frame 6 is a special sub-frame or a downlink sub-frame, the remaining sub-frames are flexible sub-frames which can be used for uplink or downlink transmission, and the sub-frame n is a fixed downlink sub-frame or a special sub-frame to carry the indication information; and Particularly when the sub-frame 7 is an uplink sub-frame, the sub-frame 6 is a special sub-frame; and when the sub-frame 7 is a downlink sub-frame, the sub-frame 6 is a downlink sub-frame.

The indication information in the embodiment of the invention includes uplink grant information and/or feedback information transmitted over a Physical Hybrid Automatic Repeat Request (HARQ) Indication Channel (PHICH), where the feedback information transmitted over the PHICH further includes an ACK feedback indicating successful transmission of the PUSCH data and an NACK feedback indicating unsuccessful transmission of the PUSCH data.

Correspondingly if the indication information received by the user equipment 10 is the uplink grant information, then it is determined that the PUSCH data needs to be transmitted to the network-side apparatus 20; and If the indication information received by the user equipment 10 is the feedback information transmitted over the PHICH, then there are two scenarios: if the feedback information is the ACK feedback indicating that the PUSCH data transmitted by the user equipment to the network-side apparatus 20 has been transmitted successfully, then the PUSCH data does not need to be retransmitted; and if the feedback information is the NACK feedback indicating that the PUSCH data transmitted by the user equipment to the network-side apparatus 20 has been transmitted unsuccessfully, then the PUSCH data needs to be retransmitted.

Interaction between the user equipment 10 and the network-side apparatus 20 will be described below in details respectively by way of an example where the indication information includes the uplink grant information and an example where the indication information includes the feedback information transmitted over the PHICH and the feedback information is the NACK feedback.

In a first scenario, the indication information includes the uplink grant information;

The network-side apparatus 20 transmits the uplink grant information to the user equipment 10 in a fixed downlink sub-frame (the sub-frame 0 or the sub-frame 5) or a special sub-frame (the sub-frame 1 or the sub-frame 6); and Correspondingly the user equipment 10 determines the uplink sub-frame to transmit the PUSCH data in the following three schemes:

In a first scheme, the user equipment 10 determines the uplink sub-frame to transmit the PUSCH data according to a timing relationship between the uplink grant information and transmission of the PUSCH data upon determining from the received uplink grant information that the uplink sub-frame to transmit the PUSCH data needs to be determined according to the timing relationship; and In an implementation, the timing relationship between the uplink grant information and transmission of the PUSCH data includes:

If the sub-frame n to carry the indication information is the sub-frame 0 or the sub-frame 5, then the uplink sub-frame to transmit the PUSCH data is the fourth sub-frame after the sub-frame n; and If the sub-frame n to carry the indication information is the sub-frame 1 or the sub-frame 6, then the uplink sub-frame to transmit the PUSCH data is the sixth sub-frame after the sub-frame n.

Where the timing relationship between the uplink grant information and transmission of the PUSCH data can alternatively be represented in the form of a table as depicted in Table 1:

TABLE 1

| | Subframe index | | | | | | | | | |
|---|---|---|---|---|---|---|---|---|---|---|
| Dynamic TDD frame | 0 | 1 | 2 | 3 | 4 | 5 | 6 | 7 | 8 | 9 |
| $k_{PUSCH}$ | 4 | 6 | | | | 4 | 6 | | | |

Where $k_{PUSCH}-1$ represents the number of sub-frames between transmission of the PUSCH data and the uplink grant information, n represents the index of the sub-frame to carry the uplink grant information, and $n+k_{PUSCH}$ represents the $k_{PUSCH}$-th after the sub-frame n which is one of the sub-frame 0, the sub-frame 1, the sub-frame 5 and the sub-frame 6;

In a second scheme, the user equipment 10 determines the uplink sub-frame to transmit the PUSCH data according to a first fixed relationship upon determining from the received uplink grant information that the uplink sub-frame to transmit the PUSCH data needs to be determined according to the first fixed relationship;

Where the first fixed relationship includes: the uplink sub-frame to transmit the PUSCH data is the seventh sub-frame after the sub-frame n; and In a third scheme, the user equipment 10 determines the uplink sub-frame to transmit the PUSCH data according to a timing relationship between the uplink grant information and transmission of the PUSCH data and determines the uplink sub-frame to transmit the PUSCH data according to a first fixed relationship upon determining from the received uplink grant information that the uplink sub-frames to transmit the PUSCH data need to be determined according to the timing relationship and the first fixed relationship; and Correspondingly the user equipment 10 needs to transmit the PUSCH data in both the uplink sub-frame, to transmit the PUSCH data, determined according to the timing relationship between the uplink grant information and transmission of the PUSCH data and the uplink sub-frame, to transmit the PUSCH data, determined according to the first fixed relationship.

For example, if the user equipment 10 receives the indication information from the network-side apparatus 20 in the sub-frame 0, and the indication information indicates that the user equipment 10 determines the uplink sub-frames respectively according to the timing relationship between the uplink grant information and transmission of the PUSCH data and to the first fixed relationship, then the uplink sub-frame, determined by the user equipment 10 according to the timing relationship between the uplink grant information and transmission of the PUSCH data, to transmit the PUSCH data is the fourth sub-frame after the sub-frame 0, i.e., the sub-frame 4 in the current radio frame, and the uplink sub-frame, to transmit the PUSCH data, determined according to the first fixed relationship is the seventh sub-frame after the sub-frame 0, i.e., the sub-frame 7 in the current radio frame, and then the user equipment 10 needs to transmit the PUSCH data in both the sub-frame 4 and the sub-frame 7 in the current radio frame.

In an implementation, the uplink grant information transmitted by the network-side apparatus 20 to the user equipment 10 may indicate the scheme for the user equipment to determine the uplink sub-frame to transmit the PUSCH data;

For example, the network-side apparatus 20 can indicate, the scheme for the user equipment 10 to determine the uplink sub-frame to transmit the PUSCH data, in 2 bits of an UL index in the uplink grant information, for example:

The Most Significant Bit (MSB) of 1 indicates that the uplink sub-frame to transmit the PUSCH data is determined according to the timing relationship between the uplink grant information and transmission of the PUSCH data; the Least Significant Bit (LSB) of 1 indicates that the uplink sub-frame to transmit the PUSCH data is determined according to the first fixed relationship; and both the MSB of 1 and the LSB of 1 indicate that the uplink sub-frames to transmit the PUSCH data are determined respectively according to the timing relationship between the uplink grant information and transmission of the PUSCH data and to the first fixed relationship.

It shall be noted that the embodiment of the invention will not be limited to the indication pattern described above, and other patterns that can indicate the scheme for the user equipment 10 to determine the uplink sub-frame to transmit the PUSCH data can also be applicable to the embodiment of the invention.

In a second scenario, the indication information includes the feedback information transmitted over the PHICH and the feedback information is NACK;

The network-side apparatus 20 determines the sub-frame n according to a timing relationship between the feedback information and transmission of the PUSCH data;

In an implementation, the network-side apparatus 20 transmits the feedback information transmitted over the PHICH in the sub-frame n upon reception of the PUSCH data from the user equipment 10 to notify the user equipment 10 of a result of data transmission; and if the feedback information is the ACK feedback, then it indicates successful transmission, and if the feedback information is the NACK feedback, then it indicates unsuccessful transmission;

In an implementation, the timing relationship between the feedback information and transmission of the PUSCH data includes:

If the sub-frame to carry the PUSCH data is the sub-frame 2 or the sub-frame 7, then the sub-frame n is the fourth sub-frame after the sub-frame to carry the PUSCH data, i.e., the sub-frame 6 in the current radio frame or the sub-frame 1 in the next radio frame;

If the sub-frame to carry the PUSCH data is the sub-frame 3 or the sub-frame 8, then the sub-frame n is the seventh sub-frame after the sub-frame to carry the PUSCH data, i.e., the sub-frame 0 in the next radio frame or the sub-frame 5 in the next radio frame; and If the sub-frame to carry the PUSCH data is the sub-frame 4 or the sub-frame 9, then the sub-frame n is the sixth sub-frame after the sub-frame to carry the PUSCH data, i.e., the sub-frame 0 in the next radio frame or the sub-frame 5 in the next radio frame;

Where the timing relationship between the feedback information and transmission of the PUSCH data can alternatively be represented in the form of a table as depicted in Table 2:

TABLE 2

|  | subframe index n | | | | | | | | | |
| --- | --- | --- | --- | --- | --- | --- | --- | --- | --- | --- |
| Dynamic TDD frame | 0 | 1 | 2 | 3 | 4 | 5 | 6 | 7 | 8 | 9 |
| $k_{PHICH}$ |  |  | 4 | 7 | 6 |  |  | 4 | 7 | 6 |

Where $k_{PHICH}-1$ represents the number of sub-frames between the feedback information and transmission of the PUSCH data, and the sub-frame to carry the PUSCH data is one of the sub-frame 2, the sub-frame 3, the sub-frame 4, the sub-frame 7, the sub-frame 8 and the sub-frame 9; and Correspondingly the user equipment 10 determines the sub-frame to transmit the PUSCH data in the following two schemes upon reception of the feedback information from the network-side apparatus 20:

In a first scheme A, the user equipment 10 determines the uplink sub-frame to transmit the PUSCH data according to a timing relationship between the feedback information and retransmission of the PUSCH data upon determining from the sub-frame n and the sub-frame to carry the PUSCH data corresponding to the feedback information that the uplink sub-frame to transmit the PUSCH data needs to be determined according to the timing relationship;

In an implementation, if the sub-frame n to carry the feedback information is the sub-frame 0 or the sub-frame 5 and the sub-frame to carry the PUSCH data corresponding to the feedback information is another uplink sub-frame than the sub-frame 4 and the sub-frame 9, then the user equipment 10 determines that the sub-frame to transmit the PUSCH data needs to be determined according to the timing relationship; and In an implementation, the timing relationship between the feedback information and retransmission of the PUSCH data includes:

The uplink sub-frame to transmit the PUSCH data is the fourth sub-frame after the sub-frame n;

Where the timing relationship between the feedback information and retransmission of the PUSCH data can alternatively be represented in the form of a table, and the timing relationship is similar to the timing relationship between the uplink grant information and transmission of the PUSCH data described above with reference to Table 1, but the respective parameters in the table are defined differently, where $k_{PUSCH}-1$ represents the number of sub-frames between retransmission of the PUSCH data and the feedback information, n represents the index of the sub-frame to carry the feedback information transmitted by the network-side apparatus 20, and $n+k_{PUSCH}$ represents the $k_{PUSCH}$-th after the sub-frame n which is one of the sub-frame 0, the sub-frame 1, the sub-frame 5 and the sub-frame 6; and Correspondingly the user equipment 10 retransmits the PUSCH data to the network side in the fourth sub-frame after the sub-frame n (i.e., the sub-frame 4 in the current radio frame or the sub-frame 9 in the current radio frame).

In the embodiment of the invention, the PUSCH data corresponding to the feedback information refers to the PUSCH data, corresponding to the feedback information, determined according to the timing relationship between the feedback information and transmission of the PUSCH data.

In a scheme B, the user equipment 10 determines the uplink sub-frame to transmit the PUSCH data according to a second fixed relationship upon determining from the sub-frame n and the sub-frame to carry the PUSCH data corresponding to the feedback information that the uplink sub-frame to transmit the PUSCH data needs to be determined according to the second fixed relationship;

In an implementation, if the sub-frame n to carry the feedback information is the sub-frame 0 or the sub-frame 5 and the sub-frame to carry the PUSCH data corresponding to the feedback information is the sub-frame 4 or the sub-frame 9, then the user equipment 10 determines that the sub-frame to transmit the PUSCH data needs to be determined according to the second fixed relationship;

Where the second fixed relationship includes: the sub-frame to transmit the PUSCH data is the seventh sub-frame after the sub-frame n; and Correspondingly the user equipment 10 retransmits the PDSCH data to the network-side apparatus 20 in the seventh sub-frame after the sub-frame n (i.e., the sub-frame 7 in the current radio frame or the sub-frame 2 in the next radio frame).

In an implementation, the user equipment 10 determines the sub-frame to carry the feedback information according to the timing relationship between the feedback information and transmission of the PUSCH data depicted in Table 2 and receives the corresponding feedback information in the determined sub-frame to carry the feedback information;

Particularly if the sub-frame to carry the PUSCH data is the sub-frame 2 or the sub-frame 7, then the sub-frame to carry the feedback information is the fourth sub-frame after the sub-frame to carry the PUSCH data, i.e., the sub-frame 6 in the current radio frame or the sub-frame 1 in the next radio frame;

If the sub-frame to carry the PUSCH data is the sub-frame 3 or the sub-frame 8, then the sub-frame to carry the feedback information is the seventh sub-frame after the sub-frame to carry the PUSCH data, i.e., the sub-frame 0 in the next radio frame or the sub-frame 5 in the next radio frame; and If the sub-frame to carry the PUSCH data is the sub-frame 4 or the sub-frame 9, then the sub-frame to carry the feedback information is the sixth sub-frame after the sub-frame to carry the PUSCH data, i.e., the sub-frame 0 in the next radio frame or the sub-frame 5 in the next radio frame.

It shall be noted that if the indication information received by the user equipment 10 includes only the uplink grant information, then the user equipment 10 determines the uplink sub-frame to carry the PUSCH data in the first scheme or the second or the third scheme described above;

If the indication information received by the user equipment 10 includes only the feedback information transmitted over the PHICH, then the user equipment 10 determines the uplink sub-frame to carry the PUSCH data in the scheme A or the scheme B described above; and If the indication information received by the user equipment 10 includes the uplink grant information and the feedback information transmitted over the PHICH and the feedback information is NACK, then the following two scenarios will be further involved:

In a first scenario, if the uplink grant information received in the sub-frame 0 or the sub-frame 5 is consistent with the contents indicated by the feedback information transmitted over the PHICH (for example, the uplink grant information indicates that the user equipment 10 determines the uplink sub-frame to carry the PUSCH data according to the timing relationship, and the sub-frame to carry the PUSCH data corresponding to the feedback information is another uplink sub-frame than the sub-frame 4 and the sub-frame 9; and in another example, the uplink grant information indicates that the user equipment 10 determines the uplink sub-frame to carry the PUSCH data according to the first fixed relationship, and the sub-frame to carry the PUSCH data corresponding to the feedback information is the sub-frame 4 or the sub-frame 9), then the user equipment 10 determines from the indication information the uplink sub-frame to carry the PUSCH data; and In a second scenario, if the uplink grant information received in the sub-frame 0 or the sub-frame 5 is not consistent with the contents indicated by the feedback information transmitted over the PHICH (for example, the uplink grant information indicates that the user equipment 10 determines the uplink sub-frame to carry the PUSCH data according to the timing relationship, but the sub-frame to carry the PUSCH data corresponding to the feedback information is the sub-frame 4 or the sub-frame 9; and in another example, the uplink grant information indicates that the user equipment 10 determines the uplink sub-frame to carry the PUSCH data according to the first fixed relationship, but the sub-frame to carry the PUSCH data corresponding to the feedback information is another uplink sub-frame than the sub-frame 4 and the sub-frame 9), then the user equipment 10 determines the uplink sub-frame to carry the PUSCH data in the scheme indicated in the uplink grant information.

Figure 4:
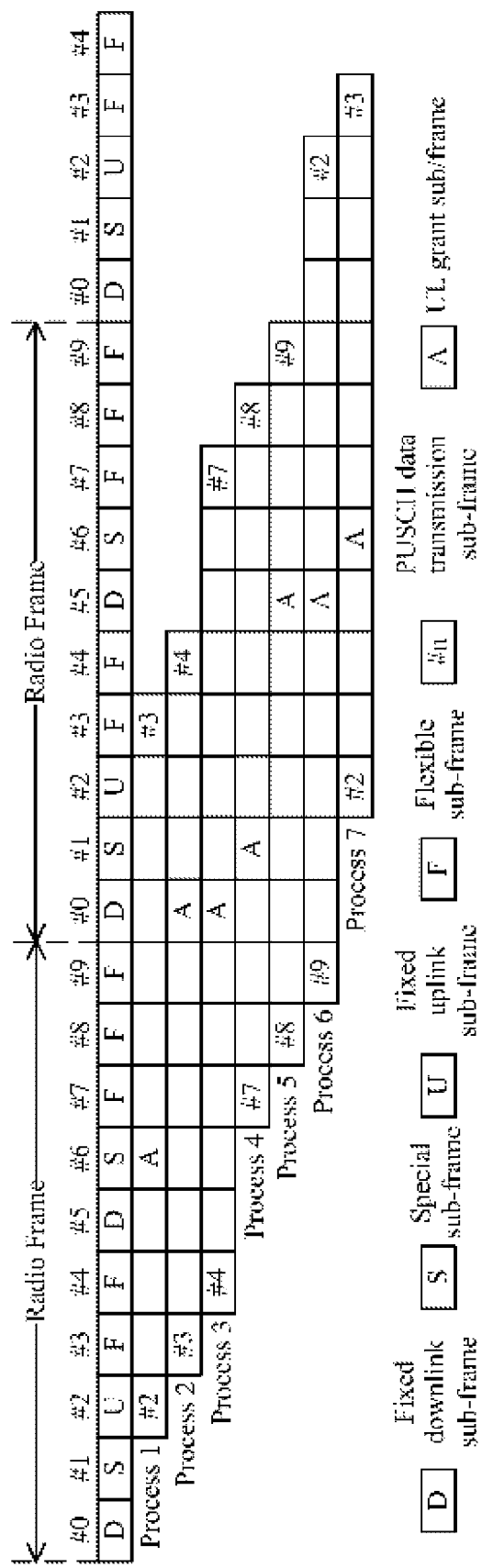
FIG. 4 is a schematic diagram of an uplink HARQ timing relationship according to an embodiment of the invention.

An uplink HARQ timing relationship of a dynamic TDD system according to an embodiment of the invention is as illustrated in FIG. 4, and in order to support backward compatibility of the dynamic TDD system according to the embodiment of the invention, that is, to allow an access of a user equipment which does not support a flexible sub-frame, e.g., a user equipment of Rel-8/9/10 or the like, the network-side apparatus 20 selects from uplink and downlink configuration processes configured for a specific user equipment (which is a user equipment which does not support a flexible sub-frame) a process, including a timing relationship between feedback information and transmission of PUSCH data, to schedule the specific user equipment;

In an implementation, the network-side apparatus 20 broadcasts an uplink and downlink configuration scheme to the specific user equipment and schedules the specific user equipment in the uplink and downlink configuration scheme in a process with the same timing relationship as an uplink and downlink HARQ process of the dynamic TDD system according to the embodiment of the invention; and Since a process in the existing configuration scheme #0 has totally the same timing relationship as the process of the dynamic TDD system according to the embodiment of the invention (as illustrated in FIG. 4), preferably the network-side apparatus 20 allocates the uplink and downlink configuration 0 for the specific user equipment;

Particularly the network-side apparatus 20 broadcasts the uplink and downlink configuration scheme #0 being currently configured for the system to the specific user equipment so that the network-side apparatus 20 can schedule the specific user equipment in all of uplink HARQ processes.

Based upon the same inventive idea, an embodiment of the invention further provides a user equipment for time division duplex transmission of uplink data, and since the user equipment addresses the problem under a similar principle to the user equipment 10 in the system illustrated in FIG. 3, reference can be made to the implementation of the user equipment 10 in the system illustrated in FIG. 3 for an implementation of the user equipment, so a repeated description thereof will be omitted here.

Figure 5:
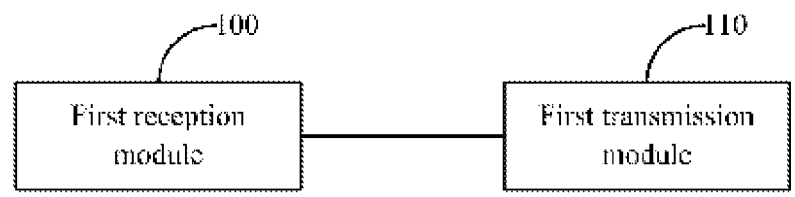
FIG. 5 is a schematic structural diagram of a user equipment for time division duplex transmission of uplink data according to an embodiment of the invention.

As illustrated in FIG. 5, a user equipment for time division duplex transmission of uplink data of an embodiment of the invention includes:

A first reception module 100 is configured to receive indication information from the network side in the sub-frame n in a radio frame, where the sub-frame 0 and the sub-frame 5 in the radio frame are fixed downlink sub-frames, the sub-frame 2 is a fixed uplink sub-frame, the sub-frame 1 is a special sub-frame, the sub-frame 6 is a special sub-frame or a downlink sub-frame, the remaining sub-frames are flexible sub-frames which can be used for uplink or downlink transmission, and the sub-frame n is a fixed downlink sub-frame or a special sub-frame; and Where when the sub-frame 7 is an uplink sub-frame, the sub-frame 6 is a special sub-frame; and when the sub-frame 7 is a downlink sub-frame, the sub-frame 6 is a downlink sub-frame; and The indication information includes uplink grant information and/or feedback information transmitted over a PHICH.

A first transmission module 110 is configured to transmit PUSCH data in at least one uplink sub-frame after the sub-frame n upon determining from the indication information that the PUSCH data needs to be transmitted to the network side.

In an implementation, the first transmission module 110 is particularly configured:

When the indication information includes the uplink grant information, to determine the uplink sub-frame to transmit the PUSCH data according to a timing relationship between the uplink grant information and transmission of the PUSCH data upon determining from the uplink grant information that the uplink sub-frame to transmit the PUSCH data needs to be determined according to the timing relationship; or to determine the uplink sub-frame to transmit the PUSCH data according to a first fixed relationship upon determining from the uplink grant information that the uplink sub-frame to transmit the PUSCH data needs to be determined according to the first fixed relationship; or to determine the uplink sub-frame to transmit the PUSCH data according to a timing relationship between the uplink grant information and transmission of the PUSCH data and determine the uplink sub-frame to transmit the PUSCH data according to a first fixed relationship upon determining from the uplink grant information that the uplink sub-frames to transmit the PUSCH data need to be determined according to the timing relationship and the first fixed relationship.

Where the timing relationship between the uplink grant information and transmission of the PUSCH data includes:

If the sub-frame n is the sub-frame 0 or the sub-frame 5, then the uplink sub-frame to transmit the PUSCH data is the fourth sub-frame after the sub-frame n; and If the sub-frame n is the sub-frame 1 or the sub-frame 6, then the uplink sub-frame to transmit the PUSCH data is the sixth sub-frame after the sub-frame n.

The first fixed relationship includes:

The uplink sub-frame to transmit the PUSCH data is the seventh sub-frame after the sub-frame n.

In an implementation, the first transmission module 110 is particularly configured:

When the indication information includes the feedback information transmitted over the PHICH and the feedback information is NACK, to determine the uplink sub-frame to transmit the PUSCH data according to a timing relationship between the feedback information and retransmission of the PUSCH data upon determining from the sub-frame n and the sub-frame to carry the PUSCH data corresponding to the feedback information that the uplink sub-frame to transmit the PUSCH data needs to be determined according to the timing relationship; or to determine the uplink sub-frame to transmit the PUSCH data according to a second fixed relationship upon determining from the sub-frame n and the sub-frame to carry the PUSCH data corresponding to the feedback information that the uplink sub-frame to transmit the PUSCH data needs to be determined according to the second fixed relationship.

Particularly the first transmission module 110 is particularly configured:

If the sub-frame n is the sub-frame 0 or the sub-frame 5 and the sub-frame to carry the PUSCH data corresponding to the feedback information is another uplink sub-frame than the sub-frame 4 and the sub-frame 9, to determine that the sub-frame to transmit the PUSCH data needs to be determined according to the timing relationship; and If the sub-frame n is the sub-frame 0 or the sub-frame 5 and the sub-frame to carry the PUSCH data corresponding to the feedback information is the sub-frame 4 or the sub-frame 9, to determine that the sub-frame to transmit the PUSCH data needs to be determined according to the second fixed relationship.

Where the timing relationship between the feedback information and retransmission of the PUSCH data includes: the uplink sub-frame to transmit the PUSCH data is the fourth sub-frame after the sub-frame n; and The second fixed relationship includes: the sub-frame to transmit the PUSCH data is the seventh sub-frame after the sub-frame n.

Particularly the first transmission module 110 is particularly configured:

To determine the sub-frame to carry the feedback information according to a timing relationship between the feedback information and transmission of the PUSCH data; and To receive the feedback information corresponding to the PUSCH data in the determined sub-frame to carry the feedback information.

Where the timing relationship between the feedback information and transmission of the PUSCH data includes:

If the sub-frame to carry the PUSCH data is the sub-frame 2 or the sub-frame 7, then the sub-frame to carry the feedback information is the fourth sub-frame after the sub-frame to carry the PUSCH data;

If the sub-frame to carry the PUSCH data is the sub-frame 3 or the sub-frame 8, then the sub-frame to carry the feedback information is the seventh sub-frame after the sub-frame to carry the PUSCH data; and If the sub-frame to carry the PUSCH data is the sub-frame 4 or the sub-frame 9, then the sub-frame to carry the feedback information is the sixth sub-frame after the sub-frame to carry the PUSCH data.

Based upon the same inventive idea, an embodiment of the invention further provides a network-side apparatus for time division duplex transmission of downlink data, and since the network-side apparatus addresses the problem under a similar principle to the network-side apparatus 20 in the system illustrated in FIG. 3, reference can be made to the implementation of the network-side apparatus 20 in the system illustrated in FIG. 3 for an implementation of the network-side apparatus, so a repeated description thereof will be omitted here.

Figure 6:
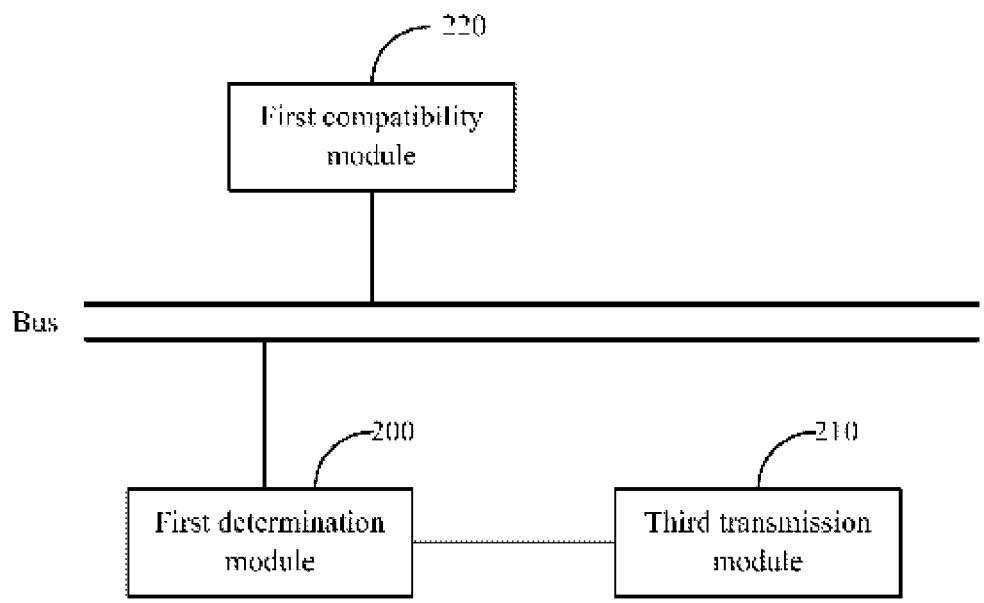
FIG. 6 is a schematic structural diagram of a network-side apparatus for time division duplex transmission of downlink data according to an embodiment of the invention.

As illustrated in FIG. 6, a network-side apparatus for time division duplex transmission of downlink data according to an embodiment of the invention includes:

A first determination module 200 is configured to determine the sub-frame n to carry indication information in a radio frame, where the sub-frame 0 and the sub-frame 5 in the radio frame are fixed downlink sub-frames, the sub-frame 2 is a fixed uplink sub-frame, the sub-frame 1 is a special sub-frame, the sub-frame 6 is a special sub-frame or a downlink sub-frame, the remaining sub-frames are flexible sub-frames which can be used for uplink or downlink transmission, and the sub-frame n is a fixed downlink sub-frame or a special sub-frame; and Where when the sub-frame 7 is an uplink sub-frame, the sub-frame 6 is a special sub-frame; and when the sub-frame 7 is a downlink sub-frame, the sub-frame 6 is a downlink sub-frame; and The indication information includes uplink grant information and/or feedback information transmitted over a PHICH.

A third transmission module 210 is configured to transmit the indication information to a user equipment in the sub-frame n.

In an implementation, the first determination module 200 is particularly configured:

When the indication information includes the feedback information transmitted over the PHICH, to determine the sub-frame n according to a timing relationship between the feedback information and transmission of PUSCH data.

Where the timing relationship between the feedback information and transmission of the PUSCH data includes:

If the sub-frame to carry the PUSCH data is the sub-frame 2 or the sub-frame 7, then the sub-frame n is the fourth sub-frame after the sub-frame to carry the PUSCH data;

If the sub-frame to carry the PUSCH data is the sub-frame 3 or the sub-frame 8, then the sub-frame n is the seventh sub-frame after the sub-frame to carry the PUSCH data; and If the sub-frame to carry the PUSCH data is the sub-frame 4 or the sub-frame 9, then the sub-frame n is the sixth sub-frame after the sub-frame to carry the PUSCH data.

In order to support backward compatibility of the dynamic TDD system according to the embodiment of the invention, the first network-side apparatus according to the embodiment of the invention further comprises:

A first compatibility module 220 is configured to select from uplink and downlink configuration processes configured for a specific user equipment process, including the timing relationship between the feedback information and transmission of the PUSCH data, to schedule the specific user equipment;

Where the specific user equipment is a user equipment which does not support a flexible sub-frame.

Preferably the first compatibility module 220 is particularly configured to allocate the uplink and downlink configuration 0 for the specific user equipment.

Based upon the same inventive idea, an embodiment of the invention further provides a method of time division duplex transmission of uplink data, and since the method addresses the problem under a similar principle to the user equipment 10 in the system illustrated in FIG. 3, reference can be made to the implementation of the user equipment 10 in the system illustrated in FIG. 3 for an implementation of the method, so a repeated description thereof will be omitted here.

Figure 7:
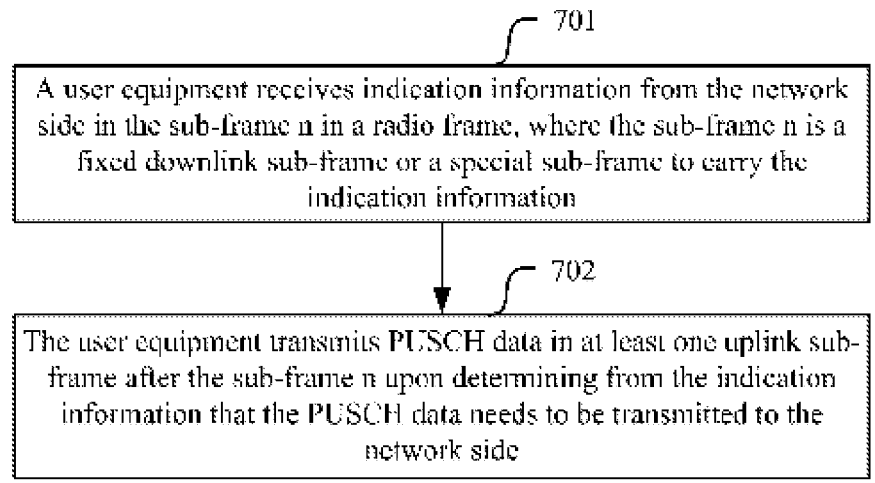
FIG. 7 is a flow chart of a method of time division duplex transmission of uplink data according to an embodiment of the invention.

As illustrated in FIG. 7, a method of time division duplex transmission of uplink data according to an embodiment of the invention includes:

In the step 701, a user equipment receives indication information from the network side in the sub-frame n in a radio frame, where the sub-frame n is a fixed downlink sub-frame or a special sub-frame to carry the indication information; and Where the sub-frame 0 and the sub-frame 5 in the radio frame are fixed downlink sub-frames, the sub-frame 2 is a fixed uplink sub-frame, the sub-frame 1 is a special sub-frame, the sub-frame 6 is a special sub-frame or a downlink sub-frame, and the remaining sub-frames are flexible sub-frames which can be used for uplink or downlink transmission;

Particularly when the sub-frame 7 is an uplink sub-frame, the sub-frame 6 is a special sub-frame; and when the sub-frame 7 is a downlink sub-frame, the sub-frame 6 is a downlink sub-frame.

In an implementation, the indication information from the network side received by the user equipment in the sub-frame n in the radio frame includes uplink grant information and/or feedback information transmitted over a PHICH, where the feedback information transmitted over the PHICH further includes an ACK feedback indicating successful transmission and an NACK feedback indicating unsuccessful transmission; and In the step 702, the user equipment transmits PUSCH data in at least one uplink sub-frame after the sub-frame n upon determining from the indication information that the PUSCH data needs to be transmitted to the network side.

Particularly if the indication information received by the user equipment includes the uplink grant information, then the user equipment determines that the PUSCH data needs to be transmitted to the network side; and if the indication information received by the user equipment is the feedback information transmitted over the PHICH, then there are two scenarios: if the feedback information is the ACK feedback indicating that the PUSCH data transmitted by the user equipment to the network side apparatus has been transmitted successfully, then the PUSCH data does not need to be retransmitted; and if the feedback information is the NACK feedback indicating that the PUSCH data transmitted by the user equipment to the network side apparatus has been transmitted unsuccessfully, then the user equipment needs to retransmit the PUSCH data.

In the step 702, the user equipment determines from uplink sub-frames after the sub-frame n at least one uplink sub-frame to transmit the PUSCH data upon determining that the PUSCH data needs to be transmitted to the network side In an implementation, the indication information includes the uplink grant information, then the user equipment determines the uplink sub-frame to transmit the PUSCH data as follows:

The user equipment determines the uplink sub-frame to transmit the PUSCH data according to a timing relationship between the uplink grant information and transmission of the PUSCH data upon determining from the uplink grant information that the uplink sub-frame to transmit the PUSCH data needs to be determined according to the timing relationship; or The user equipment determines the uplink sub-frame to transmit the PUSCH data according to a first fixed relationship upon determining from the uplink grant information that the uplink sub-frame to transmit the PUSCH data needs to be determined according to the first fixed relationship; or The user equipment determines the uplink sub-frame to transmit the PUSCH data according to a timing relationship between the uplink grant information and transmission of the PUSCH data and determines the uplink sub-frame to transmit the PUSCH data according to a first fixed relationship upon determining from the uplink grant information that the uplink sub-frames to transmit the PUSCH data need to be determined according to the timing relationship and the first fixed relationship.

Where the timing relationship between the uplink grant information and transmission of the PUSCH data includes:

If the sub-frame n is the sub-frame 0 or the sub-frame 5, then the uplink sub-frame to transmit the PUSCH data is the fourth sub-frame after the sub-frame n; and If the sub-frame n is the sub-frame 1 or the sub-frame 6, then the uplink sub-frame to transmit the PUSCH data is the sixth sub-frame after the sub-frame n.

The first fixed relationship includes:

The uplink sub-frame to transmit the PUSCH data is the seventh sub-frame after the sub-frame n.

If the indication information includes the feedback information transmitted over the PHICH and the feedback information is NACK, then the user equipment determines the uplink sub-frame to transmit the PUSCH data as follows:

The user equipment determines the uplink sub-frame to transmit the PUSCH data according to a timing relationship between the feedback information and retransmission of the PUSCH data upon determining from the sub-frame n and the sub-frame to carry the PUSCH data corresponding to the feedback information that the uplink sub-frame to transmit the PUSCH data needs to be determined according to the timing relationship; or The user equipment determines the uplink sub-frame to transmit the PUSCH data according to a second fixed relationship upon determining from the sub-frame n and the sub-frame to carry the PUSCH data corresponding to the feedback information that the uplink sub-frame to transmit the PUSCH data needs to be determined according to the second fixed relationship.

Particularly the user equipment determines that the uplink sub-frame to transmit the PUSCH data needs to be determined according to the timing relationship in the following step:

If the sub-frame n is the sub-frame 0 or the sub-frame 5 and the sub-frame to carry the PUSCH data corresponding to the feedback information is another uplink sub-frame than the sub-frame 4 and the sub-frame 9, then the user equipment determines that the sub-frame to transmit the PUSCH data needs to be determined according to the timing relationship; and The user equipment determines that the uplink sub-frame to transmit the PUSCH data needs to be determined according to the second fixed relationship in the following step:

If the sub-frame n is the sub-frame 0 or the sub-frame 5 and the sub-frame to carry the PUSCH data corresponding to the feedback information is the sub-frame 4 or the sub-frame 9, then the user equipment determines that the sub-frame to transmit the PUSCH data needs to be determined according to the second fixed relationship.

Where the timing relationship between the feedback information and retransmission of the PUSCH data includes:

The uplink sub-frame to transmit the PUSCH data is the fourth sub-frame after the sub-frame n; and The second fixed relationship includes:

The sub-frame to transmit the PUSCH data is the seventh sub-frame after the sub-frame n.

Particularly the user equipment receives the feedback information corresponding to the PDSCH data in the following steps:

The user equipment determines the sub-frame to carry the feedback information according to a timing relationship between the feedback information and transmission of the PUSCH data; and The user equipment receives the feedback information corresponding to the PUSCH data in the determined sub-frame to carry the feedback information.

Where the timing relationship between the feedback information and transmission of the PUSCH data includes:

If the sub-frame to carry the PUSCH data is the sub-frame 2 or the sub-frame 7, then the sub-frame to carry the feedback information is the fourth sub-frame after the sub-frame to carry the PUSCH data;

If the sub-frame to carry the PUSCH data is the sub-frame 3 or the sub-frame 8, then the sub-frame to carry the feedback information is the seventh sub-frame after the sub-frame to carry the PUSCH data; and If the sub-frame to carry the PUSCH data is the sub-frame 4 or the sub-frame 9, then the sub-frame to carry the feedback information is the sixth sub-frame after the sub-frame to carry the PUSCH data.

Based upon the same inventive idea, an embodiment of the invention further provides a method of time division duplex transmission of downlink data, and since the method addresses the problem under a similar principle to the network-side apparatus 20 in the system illustrated in FIG. 3, reference can be made to the implementation of the network-side apparatus 20 in the system illustrated in FIG. 3 for an implementation of the method, so a repeated description thereof will be omitted here.

Figure 8:
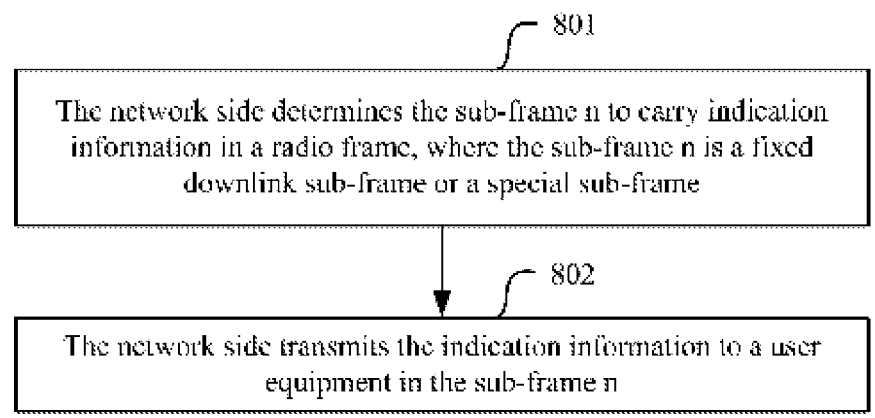
FIG. 8 is a flow chart of a method of time division duplex transmission of downlink data according to an embodiment of the invention.

As illustrated in FIG. 8, a method of time division duplex reception of downlink data according to an embodiment of the invention includes:

In the step 801, the network side determines the sub-frame n to carry indication information in a radio frame, where the sub-frame 0 and the sub-frame 5 in the radio frame are fixed downlink sub-frames, the sub-frame 2 is a fixed uplink sub-frame, the sub-frame 1 is a special sub-frame, the sub-frame 6 is a special sub-frame or a downlink sub-frame, the remaining sub-frames are flexible sub-frames which can be used for uplink or downlink transmission, and the sub-frame n is a fixed downlink sub-frame or a special sub-frame; and Where when the sub-frame 7 is an uplink sub-frame, the sub-frame 6 is a special sub-frame; and when the sub-frame 7 is a downlink sub-frame, the sub-frame 6 is a downlink sub-frame; and The indication information includes uplink grant information and/or feedback information transmitted over a PHICH.

In the step 802, the network side transmits the indication information to a user equipment in the sub-frame n.

In an implementation, if the indication information includes the feedback information transmitted over the PHICH, then the network side determines the sub-frame n to carry indication information in the radio frame in the step 801 as follows:

The network side determines the sub-frame n according to a timing relationship between the feedback information and transmission of PUSCH data.

Where the timing relationship between the feedback information and transmission of the PUSCH data includes:

If the sub-frame to carry the PUSCH data is the sub-frame 2 or the sub-frame 7, then the sub-frame n is the fourth sub-frame after the sub-frame to carry the PUSCH data;

If the sub-frame to carry the PUSCH data is the sub-frame 3 or the sub-frame 8, then the sub-frame n is the seventh sub-frame after the sub-frame to carry the PUSCH data; and If the sub-frame to carry the PUSCH data is the sub-frame 4 or the sub-frame 9, then the sub-frame n is the sixth sub-frame after the sub-frame to carry the PUSCH data.

The method of time division duplex transmission of downlink data according to the embodiment of the invention further includes:

The network side selects from uplink and downlink configuration processes configured for a specific user equipment process, including the timing relationship between the feedback information and transmission of the PUSCH data, to schedule the specific user equipment;

Where the specific user equipment is a user equipment which does not support a flexible sub-frame.

Preferably the network side allocates the uplink and downlink configuration 0 for the specific user equipment.

Figure 9:
FIG. 9 is a schematic structural diagram of a second time division duplex communication system according to an embodiment of the invention.

As illustrated in FIG. 9, a second time division duplex communication system according to an embodiment of the invention includes:

A user equipment 30 is configured to receive PDSCH data from the network side in the sub-frame m in a radio frame, to determine a sub-frame to carry feedback information corresponding to the PDSCH data according to a timing relationship between the feedback information and transmission of the PDSCH data and to transmit the feedback information in the determined sub-frame;

Where the sub-frame 0 and the sub-frame 5 in the radio frame are fixed downlink sub-frames, the sub-frame 2 is a fixed uplink sub-frame, the sub-frame 1 is a special sub-frame, the sub-frame 6 is a special sub-frame or a downlink sub-frame, the remaining sub-frames are flexible sub-frames which can be used for uplink or downlink transmission, and the sub-frame n is a downlink sub-frame (i.e., a sub-frame with a downlink transmission direction in the radio frame) to carry the PDSCH data; and A network-side apparatus 40 is configured to determine the sub-frame to carry the feedback information corresponding to the PDSCH data in the radio frame according to the timing relationship between the feedback information and transmission of the PDSCH data and to receive the feedback information from the user equipment 30 in the determined sub-frame.

In an implementation, if the network-side apparatus 40 transmits the PDSCH data to the user equipment 30 in the sub-frame to carry the PDSCH data (assumed the sub-frame m) in the radio frame, then the user equipment 30 determines the sub-frame to carry the feedback information corresponding to the PDSCH data according to the timing relationship between the feedback information and transmission of the PDSCH data upon reception of the PDSCH data in the sub-frame m in the radio frame and transmits the feedback information in the sub-frame;

Where the feedback information transmitted by the user equipment 30 includes an ACK feedback indicating successful transmission of the PUSCH data and an NACK feedback indicating unsuccessful transmission of the PUSCH data.

In an implementation, the timing relationship between the feedback information and transmission of the PDSCH data includes:

If the sub-frame m is the sub-frame 0, then the sub-frame to carry the feedback information is the twelfth sub-frame after the sub-frame m, i.e., the sub-frame 2 in the next radio frame;

If the sub-frame m is the sub-frame 1, then the sub-frame to carry the feedback information is the eleventh sub-frame after the sub-frame m, i.e., the sub-frame 2 in the next radio frame;

If the sub-frame m is the sub-frame 3, then the sub-frame to carry the feedback information is the ninth sub-frame after the sub-frame m, i.e., the sub-frame 2 in the next radio frame;

If the sub-frame m is the sub-frame 4, then the sub-frame to carry the feedback information is the eighth sub-frame after the sub-frame m, i.e., the sub-frame 2 in the next radio frame;

If the sub-frame m is the sub-frame 5, then the sub-frame to carry the feedback information is the seventh sub-frame after the sub-frame m, i.e., the sub-frame 2 in the next radio frame;

If the sub-frame m is the sub-frame 6, then the sub-frame to carry the feedback information is the sixth sub-frame after the sub-frame m, i.e., the sub-frame 2 in the next radio frame;

If the sub-frame m is the sub-frame 7, then the sub-frame to carry the feedback information is the fifth sub-frame after the sub-frame m, i.e., the sub-frame 2 in the next radio frame;

If the sub-frame m is the sub-frame 8, then the sub-frame to carry the feedback information is the fourth sub-frame after the sub-frame m, i.e., the sub-frame 2 in the next radio frame; and If the sub-frame m is the sub-frame 9, then the sub-frame to carry the feedback information is the thirteenth sub-frame after the sub-frame m, i.e., the sub-frame 2 in the second radio frame after the current radio frame.

Where the timing relationship between the feedback information and transmission of the PDSCH data can alternatively be represented in the form of a table as depicted in Table 3:

TABLE 3

| Dynamic TDD frame | subframe index | | | | | | | | | |
|---|---|---|---|---|---|---|---|---|---|---|
| | 0 | 1 | 2 | 3 | 4 | 5 | 6 | 7 | 8 | 9 |
| $k_{PDSCH}$ | 12 | 11 | | 9 | 8 | 7 | 6 | 5 | 4 | 13 |

Where $k_{PDSCH}-1$ represents the number of sub-frames between the feedback information and transmission of the PUSCH data, m represents the index of the sub-frame to carry the PUSCH data, and $m+k_{PDSCH}$ represents the $k_{PDSCH}$-th after the sub-frame m which is one of the sub-frame 0, the sub-frame 1, the sub-frame 3, the sub-frame 4, the sub-frame 5, the sub-frame 6, the sub-frame 7, the sub-frame 8 and the sub-frame 9; and Correspondingly the network-side apparatus 40 determines the sub-frame to carry the feedback information corresponding to the PDSCH data in the radio frame according to the timing relationship between the feedback information and transmission of the PDSCH data depicted in Table 3 after transmitting the PDSCH data to the user equipment 30 in the sub-frame m and receives the feedback information from the user equipment in the determined sub-frame.

Figure 10:
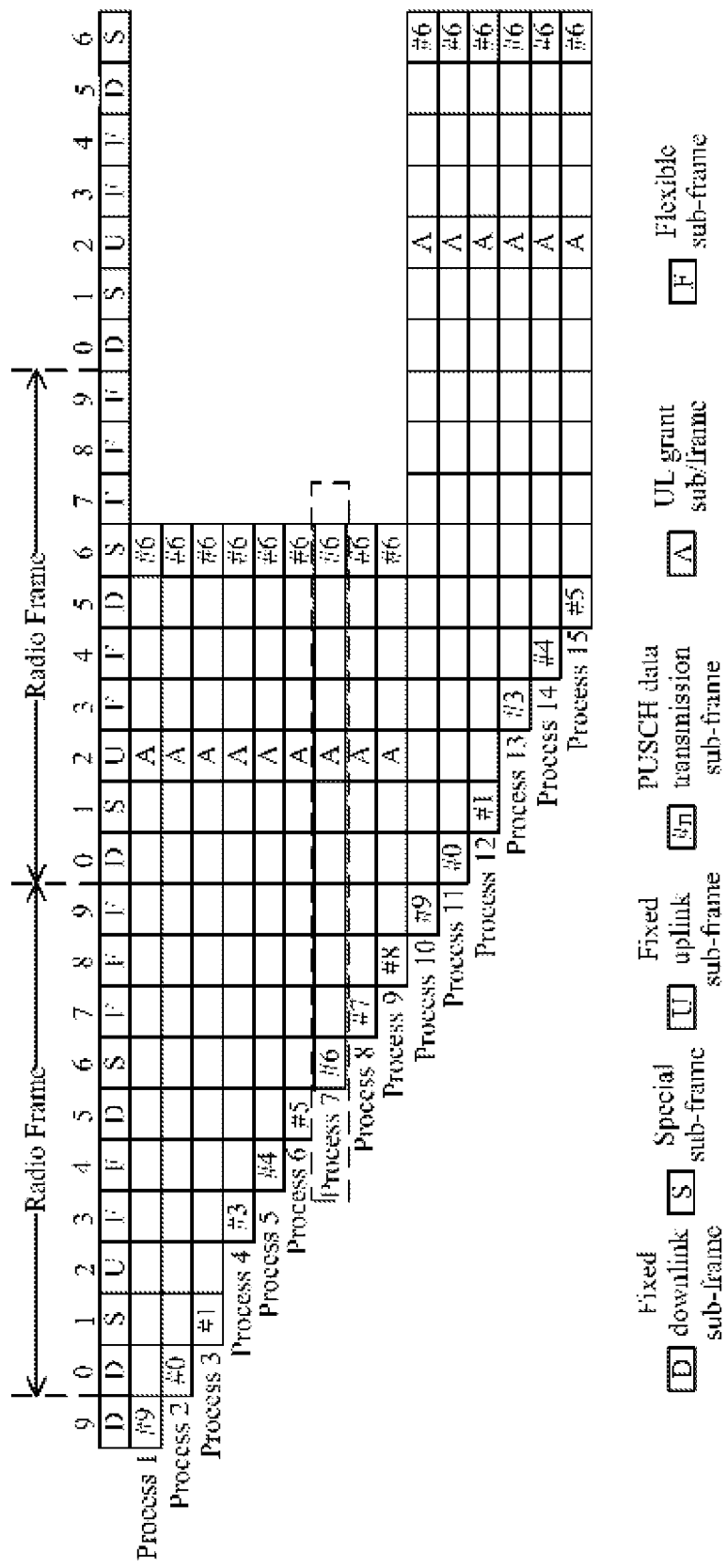
FIG. 10 is a schematic diagram of a downlink HARQ timing relationship according to an embodiment of the invention.

A downlink HARQ timing relationship of a dynamic TDD system according to an embodiment of the invention is as illustrated in FIG. 10, and in order to support backward compatibility of the dynamic TDD system according to the embodiment of the invention, that is, to allow an access of a user equipment which does not support a flexible sub-frame, e.g., a user equipment of Rel-8/9/10 or the like, the network-side apparatus 40 selects from uplink and downlink configuration processes configured for a specific user equipment (which is a user equipment which does not support a flexible sub-frame) a process, including a timing relationship between feedback information and transmission of PUSCH data, to schedule the specific user equipment;

In an implementation, if the network-side apparatus 40 broadcasts the uplink and downlink configuration scheme #0 being currently configured for the system to the specific user equipment, then since only one of processes in the downlink configuration #0 has the same timing relationship with the dynamic TDD system according to the embodiment of the invention, which is the process 7 as illustrated in FIG. 10, the network-side apparatus 40 can schedule the specific user equipment in that process, that is, transmit the PDSCH data in the sub-frame 6, and then correspondingly receives the feedback information (the ACK/NACK feedback) from the user equipment 30 in the sub-frame 2 in the next radio frame.

Of course the network-side apparatus 40 can alternatively schedule the specific user equipment in another downlink sub-frame as long as an uplink ACK/NACK feedback location available in the TDD DL/UL configuration 0 in the existing standard can be used for uplink transmission and the feedback information from the user equipment 30 can be received correctly, for example, the network-side apparatus 40 can schedule the specific user equipment in the sub-frame 0 as long as the network-side apparatus 40 can use a flexible sub-frame corresponding to the sub-frame 4 for uplink transmission.

It shall be noted that the functions of the communication system illustrated in FIG. 9 can be integrated with the functions of the communication system illustrated in FIG. 3 into a communication system, where the functions of the communication system illustrated in FIG. 3 will be performed when uplink and downlink data needs to be transmitted, and the functions of the communication system illustrated in FIG. 9 will be performed when uplink and downlink data needs to be received.

Based upon the same inventive idea, an embodiment of the invention further provides a user equipment for time division duplex reception of downlink data, and since the user equipment addresses the problem under a similar principle to the user equipment in the system illustrated in FIG. 9, reference can be made to the implementation of the user equipment in the system illustrated in FIG. 9 for an implementation of the user equipment, so a repeated description thereof will be omitted here.

Figure 11:
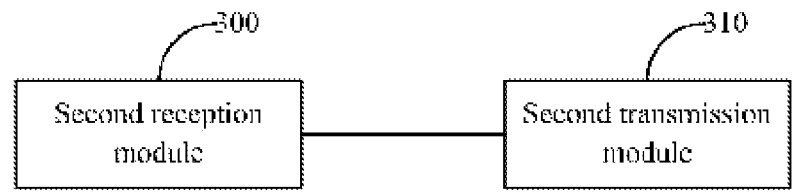
FIG. 11 is a schematic structural diagram of a user equipment for time division duplex reception of downlink data according to an embodiment of the invention.

As illustrated in FIG. 11, a user equipment for time division duplex reception of downlink data according to an embodiment of the invention includes:

A second reception module 300 is configured to receive PDSCH data from the network side in the sub-frame m in a radio frame, where the sub-frame 0 and the sub-frame 5 in the radio frame are fixed downlink sub-frames, the sub-frame 2 is a fixed uplink sub-frame, the sub-frame 1 is a special sub-frame, the sub-frame 6 is a special sub-frame or a downlink sub-frame, the remaining sub-frames are flexible sub-frames which can be used for uplink or downlink transmission, and the sub-frame n is a downlink sub-frame to carry the PDSCH data; and Where when the sub-frame 7 is an uplink sub-frame, the sub-frame 6 is a special sub-frame; and when the sub-frame 7 is a downlink sub-frame, the sub-frame 6 is a downlink sub-frame.

A second transmission module 310 is configured to determine a sub-frame to carry feedback information corresponding to the PDSCH data according to a timing relationship between the feedback information and transmission of the PDSCH data and to transmit the feedback information in the determined sub-frame.

Where the timing relationship between the feedback information and transmission of the PDSCH data includes:

If the sub-frame m is the sub-frame 0, then the sub-frame to carry the feedback information is the twelfth sub-frame after the sub-frame m;

If the sub-frame m is the sub-frame 1, then the sub-frame to carry the feedback information is the eleventh sub-frame after the sub-frame m;

If the sub-frame m is the sub-frame 3, then the sub-frame to carry the feedback information is the ninth sub-frame after the sub-frame m;

If the sub-frame m is the sub-frame 4, then the sub-frame to carry the feedback information is the eighth sub-frame after the sub-frame m;

If the sub-frame m is the sub-frame 5, then the sub-frame to carry the feedback information is the seventh sub-frame after the sub-frame m;

If the sub-frame m is the sub-frame 6, then the sub-frame to carry the feedback information is the sixth sub-frame after the sub-frame m;

If the sub-frame m is the sub-frame 7, then the sub-frame to carry the feedback information is the fifth sub-frame after the sub-frame m;

If the sub-frame m is the sub-frame 8, then the sub-frame to carry the feedback information is the fourth sub-frame after the sub-frame m; and If the sub-frame m is the sub-frame 9, then the sub-frame to carry the feedback information is the thirteenth sub-frame after the sub-frame m.

It shall be noted that the functions of the user equipment illustrated in FIG. 11 can be integrated with the functions of the user equipment illustrated in FIG. 5 into a user equipment, where the functions of the user equipment illustrated in FIG. 5 will be performed when uplink data needs to be transmitted, and the functions of the user equipment illustrated in FIG. 11 will be performed when downlink data needs to be received.

Based upon the same inventive idea, an embodiment of the invention further provides a network-side apparatus for time division duplex reception of uplink data, and since the network-side apparatus addresses the problem under a similar principle to the network-side apparatus in the system illustrated in FIG. 8, reference can be made to the implementation of the network-side apparatus in the system illustrated in FIG. 8 for an implementation of the network-side apparatus, so a repeated description thereof will be omitted here.

Figure 12:
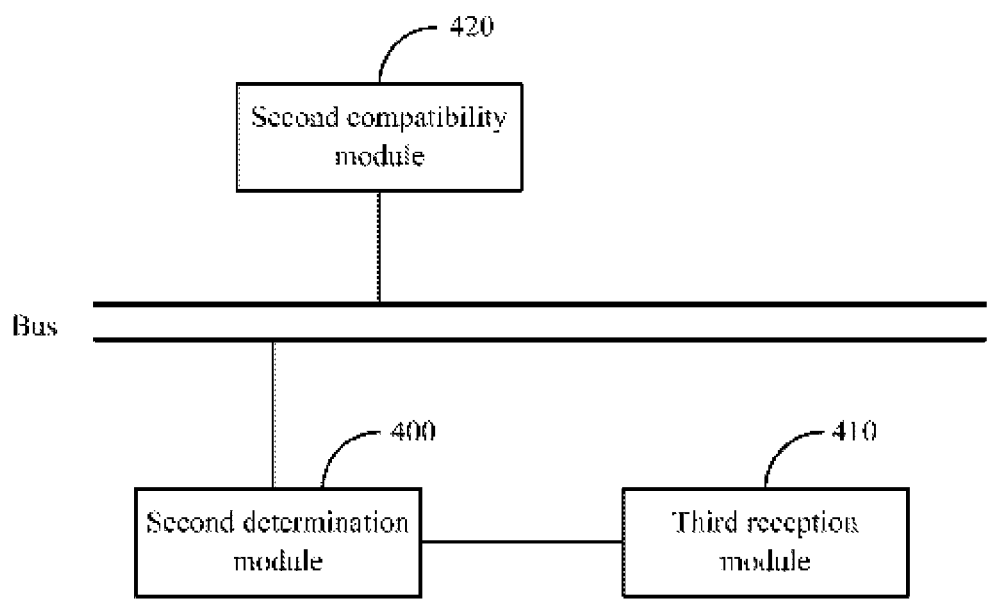
FIG. 12 is a schematic structural diagram of a network-side apparatus for time division duplex reception of uplink data according to an embodiment of the invention.

As illustrated in FIG. 12, a network-side apparatus for time division duplex reception of uplink data according to an embodiment of the invention includes:

A second determination module 400 is configured to determine a sub-frame to carry feedback information corresponding to PDSCH data in a radio frame according to a timing relationship between the feedback information and transmission of the PDSCH data, where the sub-frame 0 and the sub-frame 5 in the radio frame are fixed downlink sub-frames, the sub-frame 2 is a fixed uplink sub-frame, the sub-frame 1 is a special sub-frame, the sub-frame 6 is a special sub-frame or a downlink sub-frame, the remaining sub-frames are flexible sub-frames which can be used for uplink or downlink transmission, and the sub-frame m is a downlink sub-frame; and Where when the sub-frame 7 is an uplink sub-frame, the sub-frame 6 is a special sub-frame; and when the sub-frame 7 is a downlink sub-frame, the sub-frame 6 is a downlink sub-frame.

A third reception module 410 is configured to receive the feedback information from a user equipment in the determined sub-frame.

Where the timing relationship between the feedback information and transmission of the PDSCH data includes:

If the sub-frame to carry the PDSCH data is the sub-frame 0, then the sub-frame to carry the feedback information corresponding to the PDSCH data is the twelfth sub-frame after the sub-frame to carry the PDSCH data;

If the sub-frame to carry the PDSCH data is the sub-frame 1, then the sub-frame to carry the feedback information corresponding to the PDSCH data is the eleventh sub-frame after the sub-frame to carry the PDSCH data;

If the sub-frame to carry the PDSCH data is the sub-frame 3, then the sub-frame to carry the feedback information corresponding to the PDSCH data is the ninth sub-frame after the sub-frame to carry the PDSCH data;

If the sub-frame to carry the PDSCH data is the sub-frame 4, then the sub-frame to carry the feedback information corresponding to the PDSCH data is the eighth sub-frame after the sub-frame to carry the PDSCH data;

If the sub-frame to carry the PDSCH data is the sub-frame 5, then the sub-frame to carry the feedback information corresponding to the PDSCH data is the seventh sub-frame after the sub-frame to carry the PDSCH data;

If the sub-frame to carry the PDSCH data is the sub-frame 6, then the sub-frame to carry the feedback information corresponding to the PDSCH data is the sixth sub-frame after the sub-frame to carry the PDSCH data;

If the sub-frame to carry the PDSCH data is the sub-frame 7, then the sub-frame to carry the feedback information corresponding to the PDSCH data is the fifth sub-frame after the sub-frame to carry the PDSCH data;

If the sub-frame to carry the PDSCH data is the sub-frame 8, then the sub-frame to carry the feedback information corresponding to the PDSCH data is the fourth sub-frame after the sub-frame to carry the PDSCH data; and If the sub-frame to carry the PDSCH data is the sub-frame 9, then the sub-frame to carry the feedback information corresponding to the PDSCH data is the thirteen sub-frame after the sub-frame to carry the PDSCH data.

In order to support backward compatibility of the dynamic TDD system according to the embodiment of the invention, the network-side apparatus further includes:

A second compatibility module 420 is configured to select from uplink and downlink configuration processes configured for a specific user equipment a process, including the timing relationship between the feedback information and transmission of the PUSCH data, to schedule the specific user equipment;

Where the specific user equipment is a user equipment which does not support a flexible sub-frame.

It shall be noted that the functions of the network-side apparatus illustrated in FIG. 12 can be integrated with the functions of the network-side apparatus illustrated in FIG. 6 into a network-side apparatus, where the functions of the network-side apparatus illustrated in FIG. 6 will be performed when downlink data needs to be transmitted, and the functions of the network-side apparatus illustrated in FIG. 12 will be performed when uplink data needs to be received.

Based upon the same inventive idea, an embodiment of the invention further provides a method of time division duplex reception of downlink data, and since the method addresses the problem under a similar principle to the user equipment in the system illustrated in FIG. 8, reference can be made to the implementation of the user equipment in the system illustrated in FIG. 8 for an implementation of the method, so a repeated description thereof will be omitted here.

Figure 13:
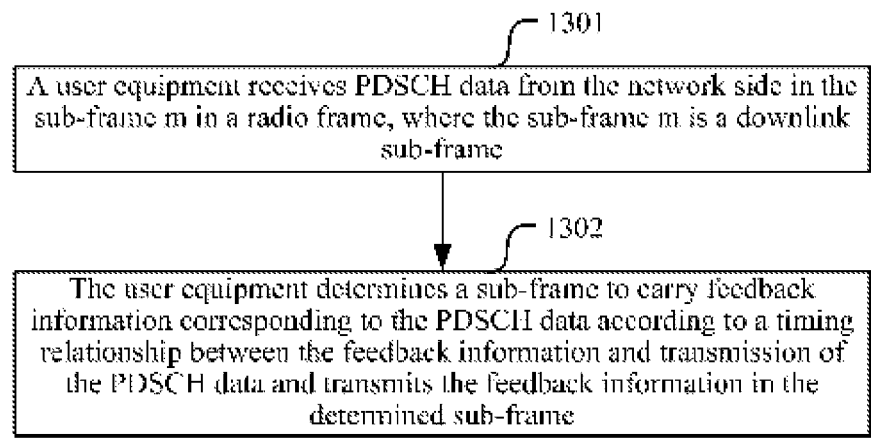
FIG. 13 is a flow chart of a method of time division duplex reception of downlink data according to an embodiment of the invention.

As illustrated in FIG. 13, a method of time division duplex reception of downlink data according to an embodiment of the invention includes:

In the step 1301, a user equipment receives PDSCH data from the network side in the sub-frame m in a radio frame, where the sub-frame 0 and the sub-frame 5 in the radio frame are fixed downlink sub-frames, the sub-frame 2 is a fixed uplink sub-frame, the sub-frame 1 is a special sub-frame, the sub-frame 6 is a special sub-frame or a downlink sub-frame, the remaining sub-frames are flexible sub-frames which can be used for uplink or downlink transmission, and the sub-frame m is a downlink sub-frame; and Where when the sub-frame 7 is an uplink sub-frame, the sub-frame 6 is a special sub-frame; and when the sub-frame 7 is a downlink sub-frame, the sub-frame 6 is a downlink sub-frame.

In the step 1302, the user equipment determines a sub-frame to carry feedback information corresponding to the PDSCH data according to a timing relationship between the feedback information and transmission of the PDSCH data and transmits the feedback information in the determined sub-frame.

Where the timing relationship between the feedback information and transmission of the PDSCH data includes:

If the sub-frame to carry the PDSCH data is the sub-frame 0, then the sub-frame to carry the feedback information is the twelfth sub-frame after the sub-frame to carry the PDSCH data;

If the sub-frame to carry the PDSCH data is the sub-frame 1, then the sub-frame to carry the feedback information is the eleventh sub-frame after the sub-frame to carry the PDSCH data;

If the sub-frame to carry the PDSCH data is the sub-frame 3, then the sub-frame to carry the feedback information is the ninth sub-frame after the sub-frame to carry the PDSCH data;

If the sub-frame to carry the PDSCH data is the sub-frame 4, then the sub-frame to carry the feedback information is the eighth sub-frame after the sub-frame to carry the PDSCH data;

If the sub-frame to carry the PDSCH data is the sub-frame 5, then the sub-frame to carry the feedback information is the seventh sub-frame after the sub-frame to carry the PDSCH data;

If the sub-frame to carry the PDSCH data is the sub-frame 6, then the sub-frame to carry the feedback information corresponding to the PDSCH data is the sixth sub-frame after the sub-frame to carry the PDSCH data;

If the sub-frame to carry the PDSCH data is the sub-frame 7, then the sub-frame to carry the feedback information is the fifth sub-frame after the sub-frame to carry the PDSCH data;

If the sub-frame to carry the PDSCH data is the sub-frame 8, then the sub-frame to carry the feedback information is the fourth sub-frame after the sub-frame to carry the PDSCH data; and If the sub-frame to carry the PDSCH data is the sub-frame 9, then the sub-frame to carry the feedback information is the thirteen sub-frame after the sub-frame to carry the PDSCH data.

It shall be noted that FIG. 13 and FIG. 8 can be integrated into a flow of a method of downlink communication, where the steps 801 and 802 will be performed when downlink data needs to be transmitted, and the steps 1301 and 1302 will be performed when downlink data needs to be received.

Based upon the same inventive idea, an embodiment of the invention further provides a method of time division duplex reception of uplink data, and since the method addresses the problem under a similar principle to the network-side apparatus in the system illustrated in FIG. 9, reference can be made to the implementation of the network-side apparatus in the system illustrated in FIG. 9 for an implementation of the method, so a repeated description thereof will be omitted here.

Figure 14:
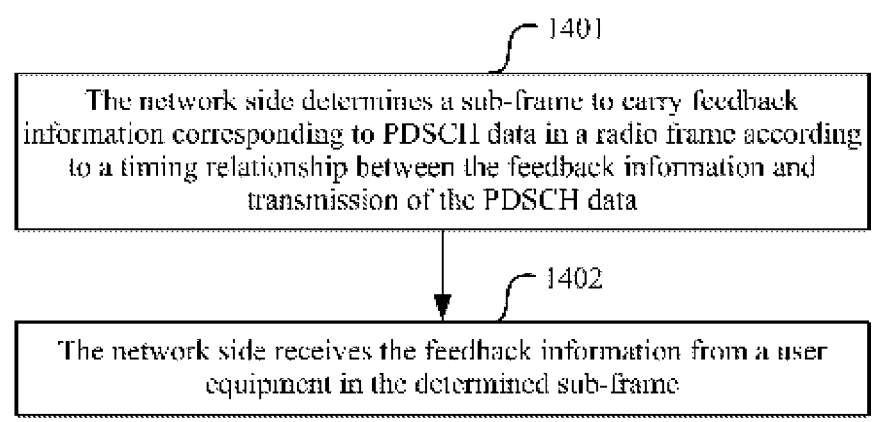
FIG. 14 is a flow chart of a method of time division duplex reception of uplink data according to an embodiment of the invention.

As illustrated in FIG. 14, a method of time division duplex transmission of downlink data according to an embodiment of the invention includes:

In the step 1401, the network side determines a sub-frame to carry feedback information corresponding to PDSCH data in a radio frame according to a timing relationship between the feedback information and transmission of the PDSCH data, where the sub-frame 0 and the sub-frame 5 in the radio frame are fixed downlink sub-frames, the sub-frame 2 is a fixed uplink sub-frame, the sub-frame 1 is a special sub-frame, the sub-frame 6 is a special sub-frame or a downlink sub-frame, and the remaining sub-frames are flexible sub-frames which can be used for uplink or downlink transmission; and Where when the sub-frame 7 is an uplink sub-frame, the sub-frame 6 is a special sub-frame; and when the sub-frame 7 is a downlink sub-frame, the sub-frame 6 is a downlink sub-frame.

In the step 1402, the network side receives the feedback information from a user equipment in the determined sub-frame.

Where the timing relationship between the feedback information and transmission of the PDSCH data includes:

If the sub-frame to carry the PDSCH data is the sub-frame 0, then the sub-frame to carry the feedback information corresponding to the PDSCH data is the twelfth sub-frame after the sub-frame to carry the PDSCH data;

If the sub-frame to carry the PDSCH data is the sub-frame 1, then the sub-frame to carry the feedback information corresponding to the PDSCH data is the eleventh sub-frame after the sub-frame to carry the PDSCH data;

If the sub-frame to carry the PDSCH data is the sub-frame 3, then the sub-frame to carry the feedback information corresponding to the PDSCH data is the ninth sub-frame after the sub-frame to carry the PDSCH data;

If the sub-frame to carry the PDSCH data is the sub-frame 4, then the sub-frame to carry the feedback information corresponding to the PDSCH data is the eighth sub-frame after the sub-frame to carry the PDSCH data;

If the sub-frame to carry the PDSCH data is the sub-frame 5, then the sub-frame to carry the feedback information corresponding to the PDSCH data is the seventh sub-frame after the sub-frame to carry the PDSCH data;

If the sub-frame to carry the PDSCH data is the sub-frame 6, then the sub-frame to carry the feedback information corresponding to the PDSCH data is the sixth sub-frame after the sub-frame to carry the PDSCH data;

If the sub-frame to carry the PDSCH data is the sub-frame 7, then the sub-frame to carry the feedback information corresponding to the PDSCH data is the fifth sub-frame after the sub-frame to carry the PDSCH data;

If the sub-frame to carry the PDSCH data is the sub-frame 8, then the sub-frame to carry the feedback information corresponding to the PDSCH data is the fourth sub-frame after the sub-frame to carry the PDSCH data; and If the sub-frame to carry the PDSCH data is the sub-frame 9, then the sub-frame to carry the feedback information corresponding to the PDSCH data is the thirteen sub-frame after the sub-frame to carry the PDSCH data.

The method of time division duplex reception of uplink data according to the embodiment of the invention further includes:

The network side selects from uplink and downlink configuration processes configured for a specific user equipment a process, including the timing relationship between the feedback information and transmission of the PUSCH data, to schedule the specific user equipment;

Where the specific user equipment is a user equipment which does not support a flexible sub-frame.

It shall be noted that FIG. 14 and FIG. 7 can be integrated into a flow of a method of uplink communication, where the steps 701 and 702 will be performed when uplink data needs to be transmitted, and the steps 1401 and 1402 will be performed when uplink data needs to be received.

Of course it shall be noted that FIG. 7, FIG. 8, FIG. 13 and FIG. 14 can be integrated into a flow of a method of uplink and downlink communication, where the steps 701 and 702 will be performed when uplink data needs to be transmitted, the steps 801 and 802 will be performed when downlink data needs to be transmitted, the steps 1301 and 1302 will be performed when downlink data needs to be received, and the steps 1401 and 1402 will be performed when uplink data needs to be received.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

In the uplink HARQ timing relationship according to the embodiments of the invention, the user equipment receives the indication information from the network side in the sub-frame n in the radio frame and transmits the PUSCH data in at least one uplink sub-frame after the sub-frame n upon determining from the indication information that the PUSCH data needs to be transmitted to the network side; and in the downlink HARQ timing relationship according to the embodiments of the invention, the user equipment receives the PDSCH data from the network side in the sub-frame m in the radio frame, determines the sub-frame to carry the feedback information corresponding to the PDSCH data according to the timing relationship between the feedback information and the PDSCH data, and transmits the feedback information in the determined sub-frame, thus addressing the problem in the prior art of the absence of an HARQ timing relationship for dynamic uplink and downlink configuration and enabling the dynamic TDD system to transmit uplink and downlink data.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

What is claimed is:

1. A method of time division duplex transmission of uplink data, wherein the method comprises:
   a user equipment receiving indication information from the network side in the sub-frame n in a radio frame, wherein the sub-frame 0 and the sub-frame 5 in the radio frame are fixed downlink sub-frames, the sub-frame 2 is a fixed uplink sub-frame, the sub-frame 1 is a special sub-frame, the sub-frame 6 is a special sub-frame or a downlink sub-frame, the remaining sub-frames are flexible sub-frames, and the sub-frame n is a fixed downlink sub-frame or a special sub-frame, wherein the flexible sub-frames are sub-frames with a variable transmission direction; and
   the user equipment transmitting PUSCH data in at least one uplink sub-frame after the sub-frame n determines from the indication information that the PUSCH data needs to be transmitted to the network side;
   wherein when the sub-frame 7 is an uplink sub-frame, the sub-frame 6 is a special sub-frame; and when the sub-frame 7 is a downlink sub-frame, the sub-frame 6 is a downlink sub-frame;
   wherein the indication information comprises feedback information transmitted over a PHICH,
   wherein the feedback information is NACK; and
   the user equipment determining the uplink sub-frame to transmit the PUSCH data comprises:
   the user equipment determining the uplink sub-frame to transmit the PUSCH data according to a timing relationship between the feedback information and retransmission of the PUSCH data upon determining from the sub-frame n and the sub-frame to carry the PUSCH data corresponding to the feedback information that the uplink sub-frame to transmit the PUSCH data needs to be determined according to the timing relationship; or
   the user equipment determining the uplink sub-frame to transmit the PUSCH data according to a second fixed relationship upon determining from the sub-frame n and the sub-frame to carry the PUSCH data corresponding to the feedback information that the uplink sub-frame to transmit the PUSCH data needs to be determined according to the second fixed relationship;
   wherein the user equipment determining that the uplink sub-frame to transmit the PUSCH data needs to be determined according to the timing relationship comprises:

if the sub-frame n is the sub-frame 0 or the sub-frame 5 and the sub-frame to carry the PUSCH data corresponding to the feedback information is another uplink sub-frame than the sub-frame 4 and the sub-frame 9, then the user equipment determining that the sub-frame to transmit the PUSCH data needs to be determined according to the timing relationship; and the user equipment determining that the uplink sub-frame to transmit the PUSCH data needs to be determined according to the second fixed relationship comprises:

if the sub-frame n is the sub-frame 0 or the sub-frame 5 and the sub-frame to carry the PUSCH data corresponding to the feedback information is the sub-frame 4 or the sub-frame 9, then the user equipment determining that the sub-frame to transmit the PUSCH data needs to be determined according to the second fixed relationship;

wherein the timing relationship between the feedback information and retransmission of the PUSCH data comprises:

the uplink sub-frame to transmit the PUSCH data is the fourth sub-frame after the sub-frame n; and the second fixed relationship comprises:

the sub-frame to transmit the PUSCH data is the seventh sub-frame after the sub-frame n;

wherein the user equipment receiving the feedback information corresponding to the PUSCH data comprises:

the user equipment determining the sub-frame to carry the feedback information according to a timing relationship between the feedback information and transmission of the PUSCH data; and the user equipment receiving the feedback information corresponding to the PUSCH data in the determined sub-frame to carry the feedback information;

wherein the timing relationship between the feedback information and transmission of the PUSCH data comprises:

if the sub-frame to carry the PUSCH data is the sub-frame 2 or the sub-frame 7, then the sub-frame to carry the feedback information is the fourth sub-frame after the sub-frame to carry the PUSCH data;

if the sub-frame to carry the PUSCH data is the sub-frame 3 or the sub-frame 8, then the sub-frame to carry the feedback information is the seventh sub-frame after the sub-frame to carry the PUSCH data; and if the sub-frame to carry the PUSCH data is the sub-frame 4 or the sub-frame 9, then the sub-frame to carry the feedback information is the sixth sub-frame after the sub-frame to carry the PUSCH data.

2. The method of claim 1, wherein the indication information comprises the uplink grant information; and the user equipment determining the uplink sub-frame to transmit the PUSCH data comprises:

the user equipment determining the uplink sub-frame to transmit the PUSCH data according to a timing relationship between the uplink grant information and transmission of the PUSCH data upon determining from the uplink grant information that the uplink sub-frame to transmit the PUSCH data needs to be determined according to the timing relationship; or the user equipment determining the uplink sub-frame to transmit the PUSCH data according to a first fixed relationship upon determining from the uplink grant information that the uplink sub-frame to transmit the PUSCH data needs to be determined according to the first fixed relationship; or the user equipment determining the uplink sub-frame to transmit the PUSCH data according to a timing relationship between the uplink grant information and transmission of the PUSCH data and determining the uplink sub-frame to transmit the PUSCH data according to a first fixed relationship upon determining from the uplink grant information that the uplink sub-frames to transmit the PUSCH data need to be determined according to the timing relationship and the first fixed relationship;

wherein the timing relationship between the uplink grant information and transmission of the PUSCH data comprises:

if the sub-frame n is the sub-frame 0 or the sub-frame 5, then the uplink sub-frame to transmit the PUSCH data is the fourth sub-frame after the sub-frame n, and if the sub-frame n is the sub-frame 1 or the sub-frame 6, then the uplink sub-frame to transmit the PUSCH data is the sixth sub-frame after the sub-frame n; and the first fixed relationship comprises:

the uplink sub-frame to transmit the PUSCH data is the seventh sub-frame after the sub-frame n.

3. A method of time division duplex reception of downlink data, wherein the method comprises:

a user equipment receiving PDSCH data from the network side in the sub-frame m in a radio frame, wherein the sub-frame 0 and the sub-frame 5 in the radio frame are fixed downlink sub-frames, the sub-frame 2 is a fixed uplink sub-frame, the sub-frame 1 is a special sub-frame, the sub-frame 6 is a special sub-frame or a downlink sub-frame, the remaining sub-frames are flexible sub-frames, and the sub-frame m is a downlink sub-frame to carry the PDSCH data, wherein the flexible sub-frames are sub-frames with a variable transmission direction; and the user equipment determining a sub-frame to carry feedback information corresponding to the PDSCH data according to a timing relationship between the feedback information and transmission of the PDSCH data and transmitting the feedback information in the determined sub-frame;

wherein when the sub-frame 7 is an uplink sub-frame, the sub-frame 6 is a special sub-frame; and when the sub-frame 7 is a downlink sub-frame, the sub-frame 6 is a downlink sub-frame;

wherein the timing relationship between the feedback information and transmission of the PDSCH data comprises:

if the sub-frame m is the sub-frame 0, then the sub-frame to carry the feedback information is the twelfth sub-frame after the sub-frame m;

if the sub-frame m is the sub-frame 1, then the sub-frame to carry the feedback information is the eleventh sub-frame after the sub-frame m;

if the sub-frame m is the sub-frame 3, then the sub-frame to carry the feedback information is the ninth sub-frame after the sub-frame m;

if the sub-frame m is the sub-frame 4, then the sub-frame to carry the feedback information is the eighth sub-frame after the sub-frame m;

if the sub-frame m is the sub-frame 5, then the sub-frame to carry the feedback information is the seventh sub-frame after the sub-frame m;

if the sub-frame m is the sub-frame 6, then the sub-frame to carry the feedback information is the sixth sub-frame after the sub-frame m;

if the sub-frame m is the sub-frame 7, then the sub-frame to carry the feedback information is the fifth sub-frame after the sub-frame m;

if the sub-frame m is the sub-frame 8, then the sub-frame to carry the feedback information is the fourth sub-frame after the sub-frame m; and if the sub-frame m is the sub-frame 9, then the sub-frame to carry the feedback information is the thirteenth sub-frame after the sub-frame m.

4. A method of time division duplex transmission of downlink data, wherein the network side determining the sub-frame n to carry indication information in a radio frame, wherein the sub-frame 0 and the sub-frame 5 in the radio frame are fixed downlink sub-frames, the sub-frame 2 is a fixed uplink sub-frame, the sub-frame 1 is a special sub-frame, the sub-frame 6 is a special sub-frame or a downlink sub-frame, the remaining sub-frames are flexible sub-frames, and the sub-frame n is a fixed downlink sub-frame or a special sub-frame, wherein the flexible sub-frames are sub-frames with a variable transmission direction; and the network side transmitting the indication information to a user equipment in the sub-frame n;

wherein when the sub-frame 7 is an uplink sub-frame, the sub-frame 6 is a special sub-frame; and when the sub-frame 7 is a downlink sub-frame, the sub-frame 6 is a downlink sub-frame;

wherein the indication information comprises feedback information transmitted over a PHICH;

the network side determining the sub-frame n comprises:

the network side determining the sub-frame n according to a timing relationship between the feedback information and transmission of PUSCH data;

wherein the timing relationship between the feedback information and transmission of the PUSCH data comprises:

if the sub-frame to carry the PUSCH data is the sub-frame 2 or the sub-frame 7, then the sub-frame n is the fourth sub-frame after the sub-frame to carry the PUSCH data;

if the sub-frame to carry the PUSCH data is the sub-frame 3 or the sub-frame 8, then the sub-frame n is the seventh sub-frame after the sub-frame to carry the PUSCH data; and if the sub-frame to carry the PUSCH data is the sub-frame 4 or the sub-frame 9, then the sub-frame n is the sixth sub-frame after the sub-frame to carry the PUSCH data.

5. The method of claim 4, wherein the method further comprises:

the network side selecting from uplink and downlink configuration processes configured for a specific user equipment process, comprising the timing relationship between the feedback information and transmission of the PUSCH data, to schedule the specific user equipment;

wherein the specific user equipment is a user equipment which does not support a flexible sub-frame;

wherein the network side allocates the uplink and downlink configuration 0 for the specific user equipment.

6. A method of time division duplex reception of uplink data, wherein the method comprises:

the network side determining a sub-frame to carry feedback information corresponding to PDSCH data in a radio frame according to a timing relationship between the feedback information and transmission of the PDSCH data, wherein the sub-frame 0 and the sub-frame 5 in the radio frame are fixed downlink sub-frames, the sub-frame 2 is a fixed uplink sub-frame, the sub-frame 1 is a special sub-frame, the sub-frame 6 is a special sub-frame or a downlink sub-frame, and the remaining sub-frames are flexible sub-frames, wherein the flexible sub-frames are sub-frames with a variable transmission direction; and the network side receiving the feedback information from a user equipment in the determined sub-frame;

wherein when the sub-frame 7 is an uplink sub-frame, the sub-frame 6 is a special sub-frame; and when the sub-frame 7 is a downlink sub-frame, the sub-frame 6 is a downlink sub-frame;

wherein the timing relationship between the feedback information and transmission of the PDSCH data comprises:

if the sub-frame to carry the PDSCH data is the sub-frame 0, then the sub-frame to carry the feedback information corresponding to the PDSCH data is the twelfth sub-frame after the sub-frame to carry the PDSCH data;

if the sub-frame to carry the PDSCH data is the sub-frame 1, then the sub-frame to carry the feedback information corresponding to the PDSCH data is the eleventh sub-frame after the sub-frame to carry the PDSCH data;

if the sub-frame to carry the PDSCH data is the sub-frame 3, then the sub-frame to carry the feedback information corresponding to the PDSCH data is the ninth sub-frame after the sub-frame to carry the PDSCH data;

if the sub-frame to carry the PDSCH data is the sub-frame 4, then the sub-frame to carry the feedback information corresponding to the PDSCH data is the eighth sub-frame after the sub-frame to carry the PDSCH data;

if the sub-frame to carry the PDSCH data is the sub-frame 5, then the sub-frame to carry the feedback information corresponding to the PDSCH data is the seventh sub-frame after the sub-frame to carry the PDSCH data;

if the sub-frame to carry the PDSCH data is the sub-frame 6, then the sub-frame to carry the feedback information corresponding to the PDSCH data is the sixth sub-frame after the sub-frame to carry the PDSCH data;

if the sub-frame to carry the PDSCH data is the sub-frame 7, then the sub-frame to carry the feedback information corresponding to the PDSCH data is the fifth sub-frame after the sub-frame to carry the PDSCH data;

if the sub-frame to carry the PDSCH data is the sub-frame 8, then the sub-frame to carry the feedback information corresponding to the PDSCH data is the fourth sub-frame after the sub-frame to carry the PDSCH data; and if the sub-frame to carry the PDSCH data is the sub-frame 9, then the sub-frame to carry the feedback information corresponding to the PDSCH data is the thirteen sub-frame after the sub-frame to carry the PDSCH data.

7. The method of claim 6, wherein the method further comprises:

the network side selecting from uplink and downlink configuration processes configured for a specific user equipment a process, comprising the timing relationship between the feedback information and transmission of the PUSCH data, to schedule the specific user equipment;

wherein the specific user equipment is a user equipment which does not support a flexible sub-frame.

* * * * *